Dec. 28, 1937.   F. B. THOMAS   2,103,305
TEST RACK
Filed April 27, 1935   6 Sheets-Sheet 2

INVENTOR
FRANK B. THOMAS
BY Wm. M. Cady
ATTORNEY

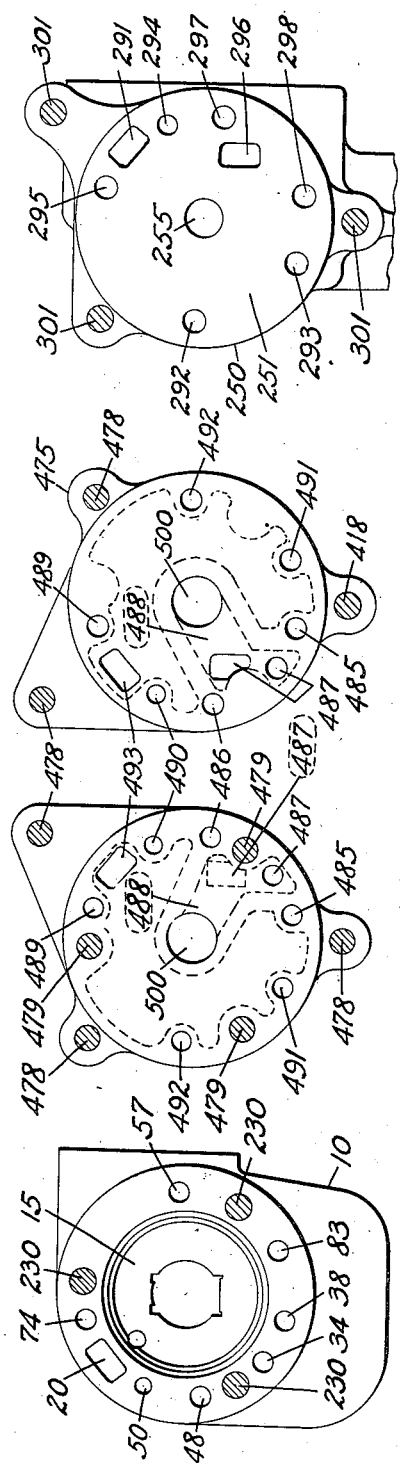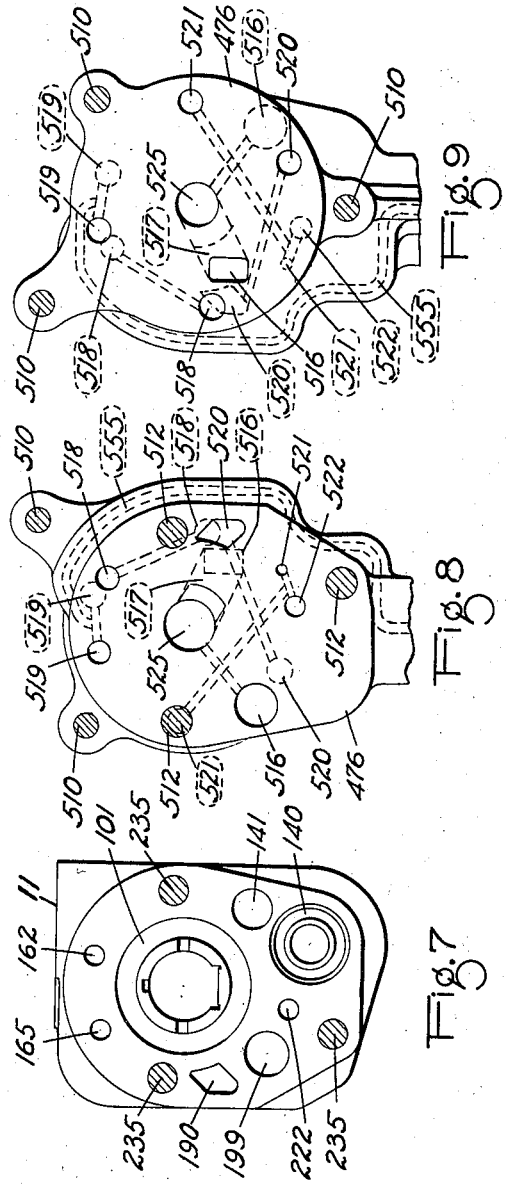

Dec. 28, 1937. F. B. THOMAS 2,103,305
TEST RACK
Filed April 27, 1935 6 Sheets-Sheet 4
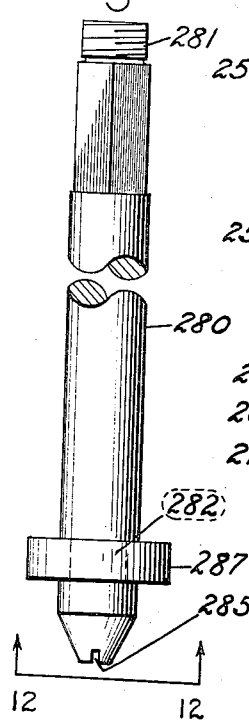
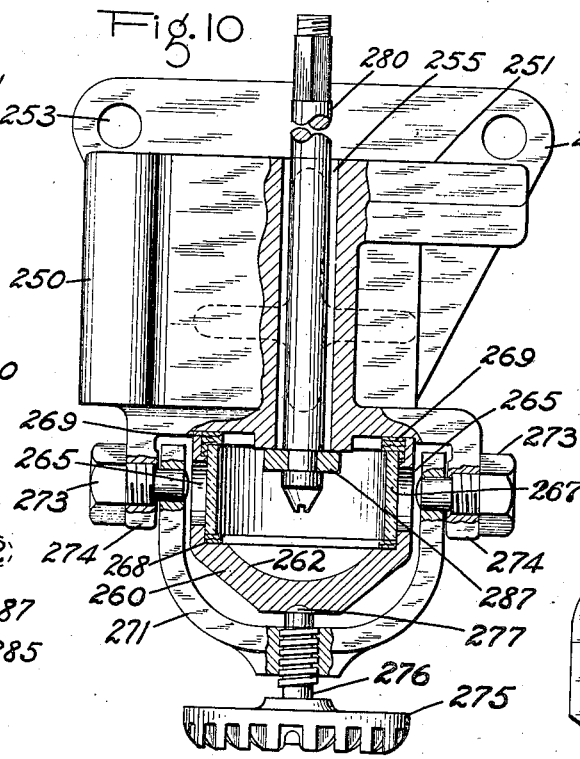
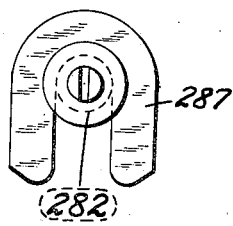
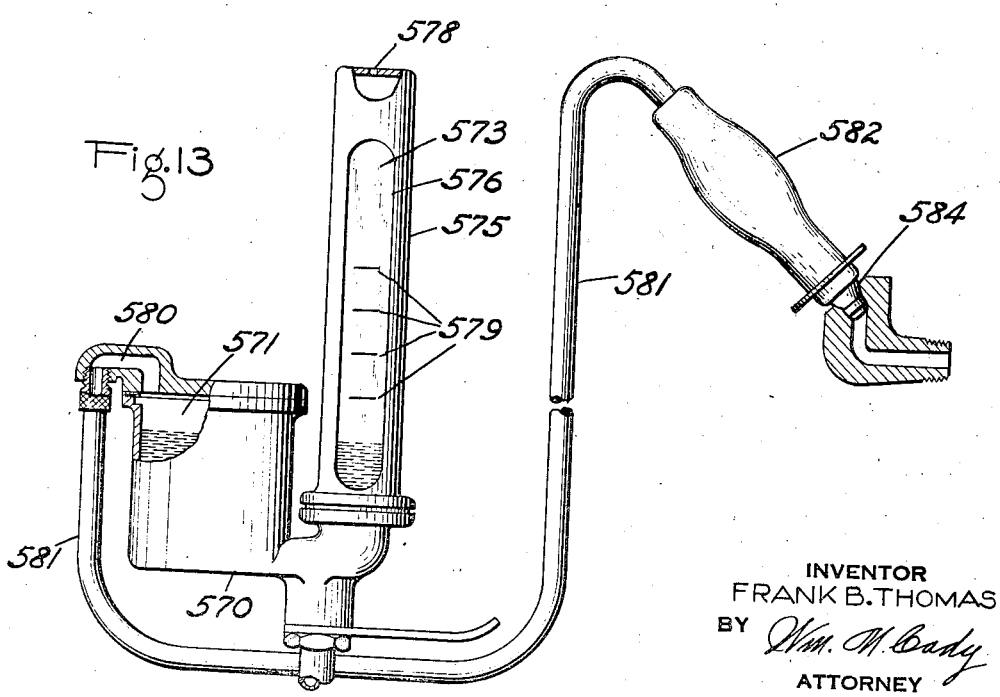
INVENTOR
FRANK B. THOMAS
BY Wm. M. Cady
ATTORNEY

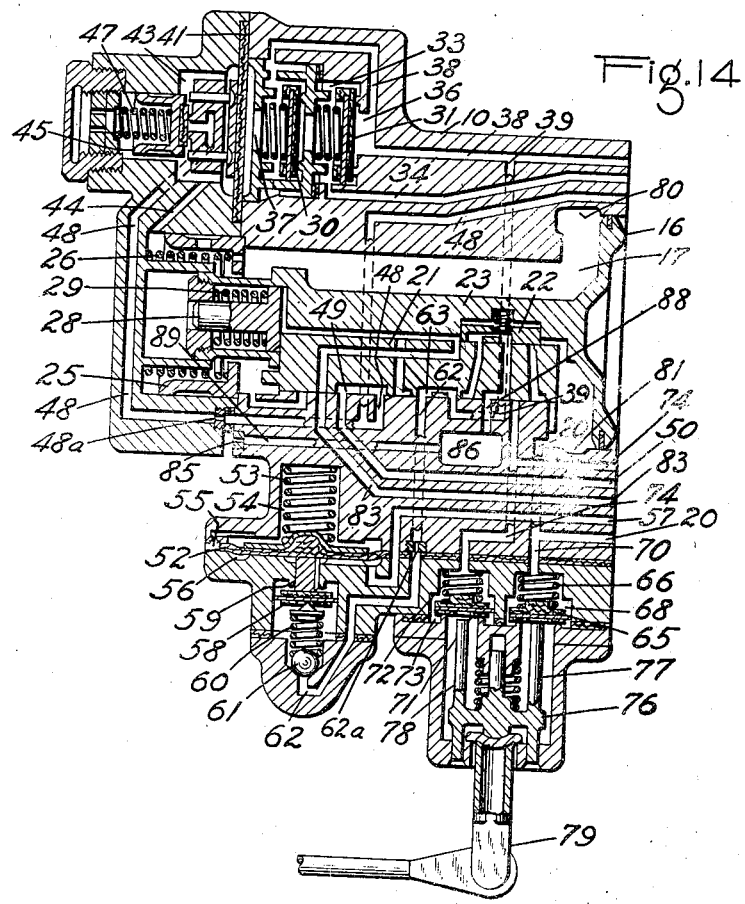

Dec. 28, 1937.                F. B. THOMAS                2,103,305
                                TEST RACK
                          Filed April 27, 1935        6 Sheets-Sheet 6
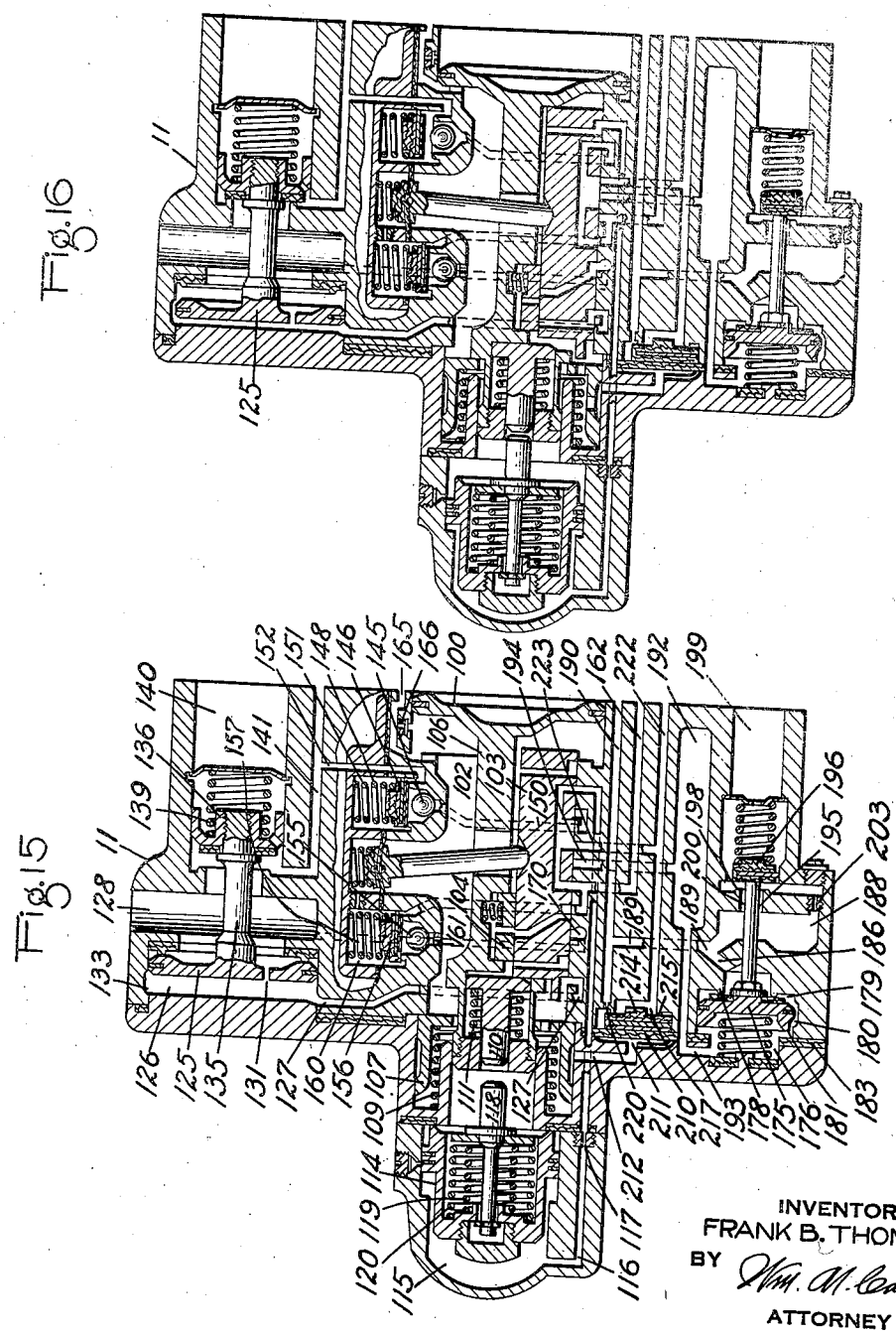
INVENTOR
FRANK B. THOMAS
BY
Wm. M. Cady
ATTORNEY Patented Dec. 28, 1937

2,103,305

UNITED STATES PATENT OFFICE 2,103,305

TEST RACK

Frank B. Thomas, Irwin, Pa., assignor to The Westinghouse Air Brake Company, Wilmerding, Pa., a corporation of Pennsylvania Application April 27, 1935, Serial No. 18,604

22 Claims. (Cl. 73—51)

This invention relates to a testing apparatus adapted to be used to test brake controlling valve devices employed on railway cars, and particularly to test apparatus adapted to be used to test brake controlling valve devices of the type shown in the application of Clyde C. Farmer, Serial No. 612,465, filed May 20, 1932 and resulting in U. S. Patent No. 2,031,213, issued February 18, 1936.

One object of this invention is to provide a testing device or apparatus adapted to be employed to test brake controlling valve devices, and which will show promptly and accurately whether the valve devices tested are up to the proper standard of workmanship and general condition, and if not, where they deviate from the standard.

Another object of the invention is to provide a testing device adapted to be employed to test brake controlling valve devices of the type having a service portion and an emergency portion, and having means to adapt the testing device to accommodate either of these portions.

A further object of the invention is to provide a testing device adapted to test a brake controlling valve device of the type having a body having a plurality of passages therein communicating with ports in one face thereof, the testing device having a member having a plurality of passages therein and having testing equipment associated therewith, the passages being adapted to be connected to the ports in the brake valve body whereby the condition of the brake controlling valve device may be tested.

A further object of the invention is to provide a testing device adapted to test the service and emergency portions of a brake controlling valve device, each of which portions has a body having a plurality of passages therein communicating with ports in one face of the body, the testing device having a bracket member having a plurality of ports in a face thereof, and having passages communicating with said ports and having testing equipment associated with said passages, and means adapted to be interposed between a brake controlling valve device portion to be tested and the bracket member of the test device to establish communication between the ports in the valve body and the bracket member.

Another object of the invention is to provide a testing device adapted to be employed to test brake controlling valve devices, and having reservoirs analogous to the auxiliary and emergency reservoirs, and a reservoir analogous to the brake cylinder, together with means to connect these reservoirs with the proper portions of the brake controlling valve device being tested, and having indicating equipment associated with selected ones of the passages in the testing apparatus, whereby pressure conditions in said passages may be observed.

A further object of the invention is to provide a testing device having a bracket member having a plurality of ports in a face thereof, the bracket member being adapted to have a brake controlling valve device portion to be tested secured thereto, and having means to maintain the brake controlling valve device piston in a predetermined position relative to the brake controlling valve device body during testing of the valve device portion.

Other objects of the invention and features of novelty will be apparent from the following description taken in connection with the accompanying drawings in which, Fig. 1 is a diagrammatic view of one embodiment of the testing apparatus provided by my invention, together with a sectional diagrammatic view of the service portion of a brake controlling valve device in position to be tested, the piston of the brake controlling valve device being shown in the release and charging position;

Fig. 3 is an elevational view of the end face of the service portion of a brake controlling valve device of the type adapted to be tested by the equipment provided by this invention and showing the arrangement of the ports in the valve body;

Fig. 4 is an elevational view of a face of the service portion filling piece employed with the testing apparatus provided by this invention, the face shown being that which lies adjacent the face of the service portion shown in Fig. 3;

Fig. 5 is an elevational view of the opposite face of the filling piece shown in Fig. 4, the face shown being adapted to lie adjacent to the face of the bracket member shown in Fig. 6;

Fig. 6 is an elevational view of a face of the bracket member employed in the testing device provided by my invention, showing the arrangement of the ports in this member, the face shown being that which is adapted to have the filling pieces lie thereagainst;

Fig. 7 is a view similar to Fig. 3 and showing the end face of the emergency section of a brake controlling valve device of the type which the testing device provided by my invention is designed to test;

Fig. 8 is a view similar to Fig. 4 and showing a face of the filling piece employed in testing an emergency section, the face shown being that which lies adjacent to the emergency section;

Fig. 9 is a view similar to Fig. 5 and showing the opposite face of the filling piece shown in Fig. 8, the face shown being adapted to lie adjacent to the face of the bracket member shown in Fig. 6;

Fig. 10 is a top plan view of the bracket member employed with the testing device provided by my invention, with parts broken away and shown in section to more clearly reveal other parts;

Fig. 11 is an elevational view of the piston stop stem employed with the bracket member in the testing device provided by my invention, the horse shoe or locking member employed with the stem being shown in place;

Fig. 12 is a view of the piston stop stem taken substantially from the line 12—12 of Fig. 11;

Fig. 13 is an elevational view of the leakage indicating apparatus which is employed in connection with the testing apparatus provided by this invention;

Fig. 14 is a sectional diagrammatic view of the service portion of a brake controlling valve device of the type which this equipment is designed to test, the piston and slide valve of the valve device being shown in the service position;

Fig. 15 is a sectional diagrammatic view of the emergency portion of the brake controlling valve device of the type which this apparatus is designed to test, the piston and slide valve of the valve device being shown in the emergency position; and Fig. 16 is a view similar to Fig. 15 and showing the valve device with the piston and slide valve moved to the accelerated emergency release position.

Figure 1:
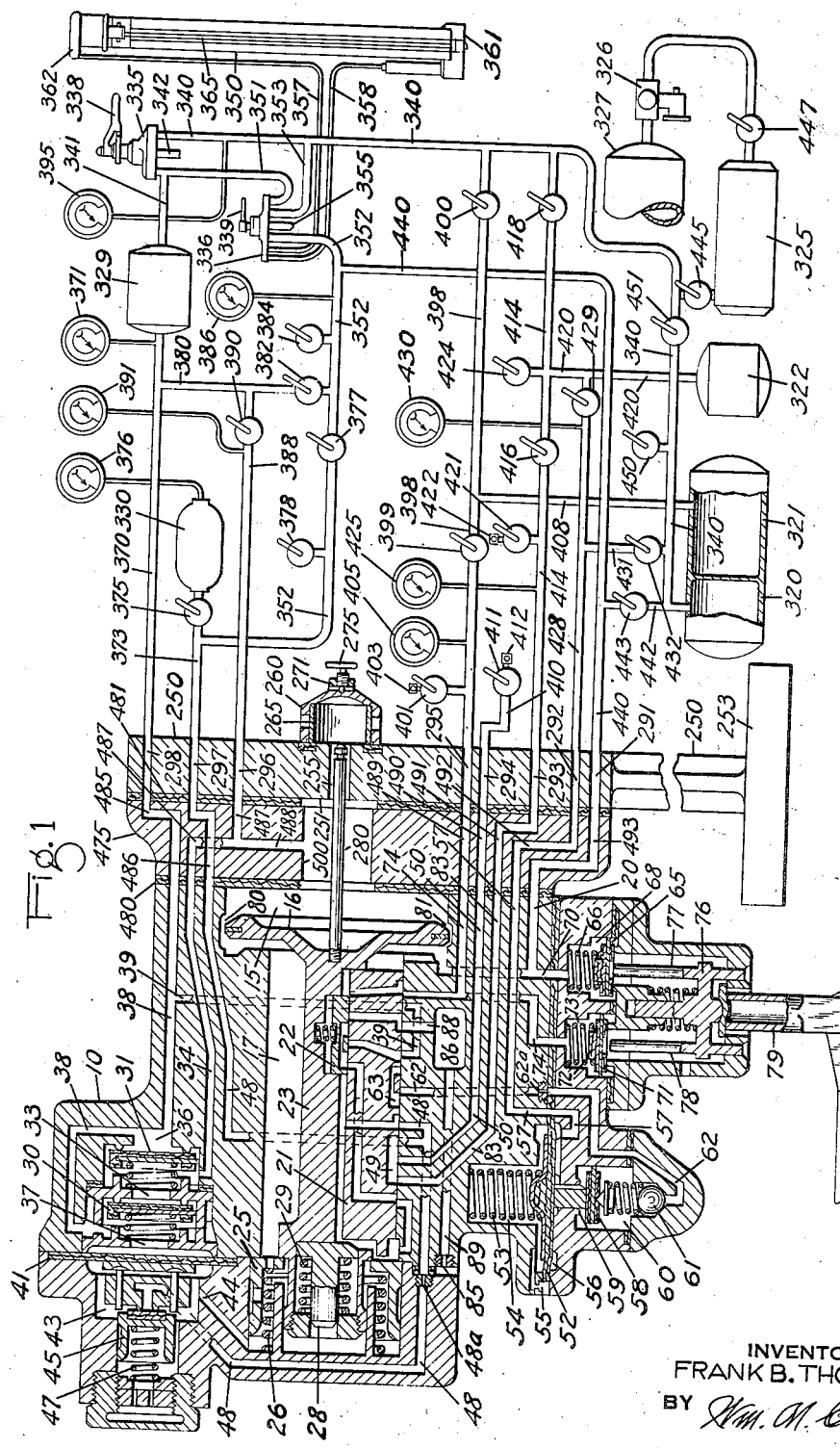
Figure 2:
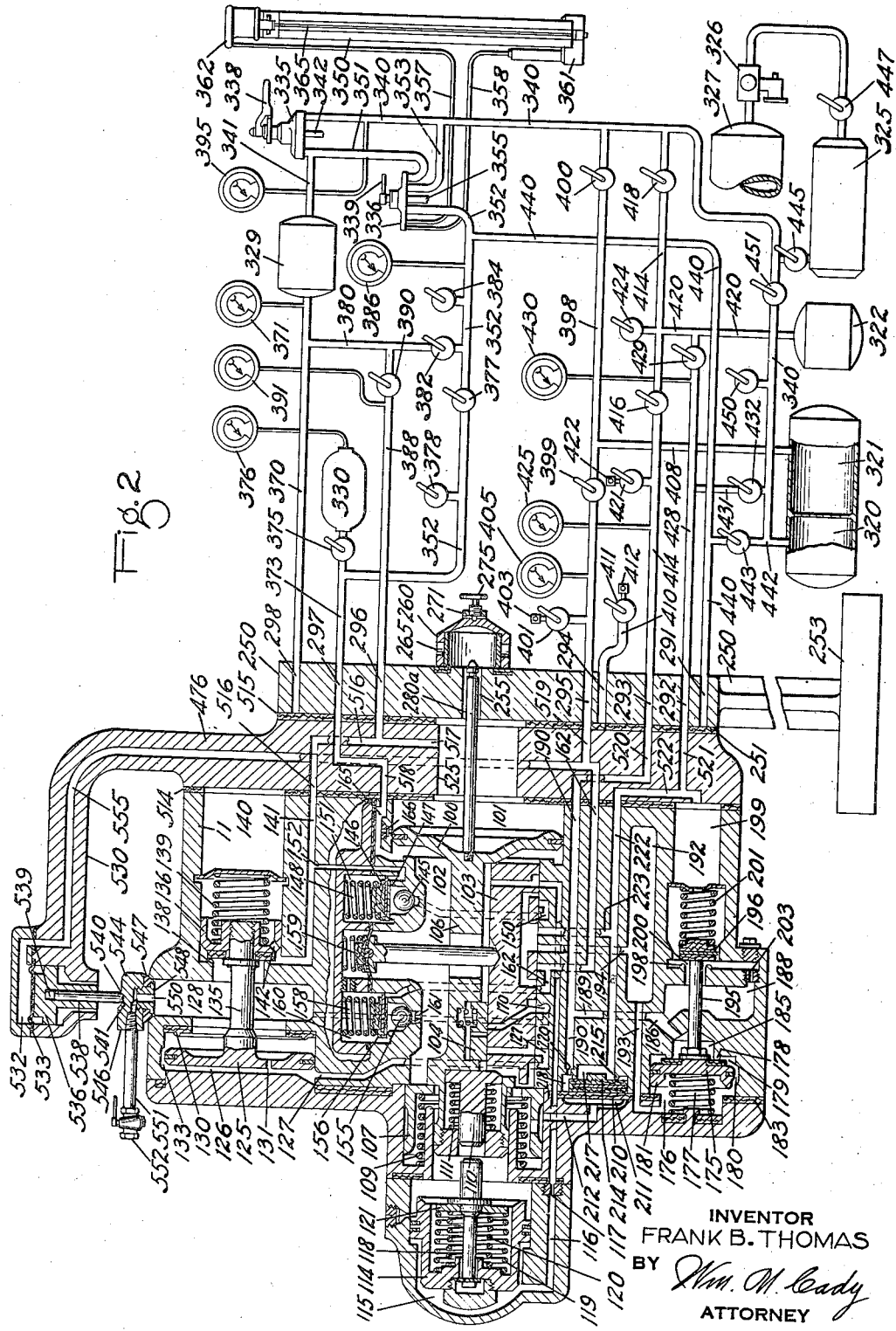
Fig. 2 is a diagrammatic view of the testing apparatus provided by my invention, together with a sectional diagrammatic view of the emergency portion of a brake controlling valve device in position to be tested, the piston of the brake controlling valve device being shown in the release and charging position.

Referring to the drawings, the testing apparatus provided by my invention is shown diagrammatically in Figs. 1 and 2, the apparatus being shown in Fig. 1 in connection with the service portion of a brake controlling valve device of the type which the apparatus is designed to test, and being shown in Fig. 2 in connection with the emergency portion of the brake controlling valve device.

The brake controlling valve device which the test apparatus provided by this invention is designed to test comprises a service portion, shown in section in Fig. 1 of the drawings, and having a casing indicated generally by the reference character 10, and an emergency portion shown in Fig. 2 of the drawings, and having a casing indicated generally by the reference character 11. The service and emergency portions are secured to opposite faces of a pipe bracket portion (not shown), and the faces of the service and emergency portions each have a plurality of ports therein, which when the portions are in position against the faces of the pipe bracket portion, are adapted to communicate with ports in the faces of the pipe bracket section.

The service portion casing has a piston chamber 15 formed therein and containing a piston 16, and on the opposite side of the piston is a valve chamber 17 which, when the valve device is in service, is connected with an auxiliary reservoir by way of a passage 20. The valve chamber 17 also contains a main slide valve 21 and an auxiliary slide valve 22 adapted to be operated by the piston through the piston stem 23. The valve chamber also contains a return piston 25 which is engaged by the end of the piston stem 23, and which is urged to the right, as viewed in Fig. 1 of the drawings, by the return spring 26. The piston stem 23 has a plunger 28 associated therewith and engageable with the end of the slide valve 21. Movement of the plunger 28 is opposed by the spring 29.

The service portion also includes a release by-pass check valve 30, and an application by-pass check valve 31, the chamber 33 between the check valves being connected by way of the passage 34 to a port in the face of the body of the valve portion, while the chamber 36 on the right hand side of the application by-pass check valve 31, and the chamber 37 on the left hand side of the release by-pass check valve 30 are connected by way of the passage 38 with a port in the face of the valve portion body, and are connected by way of the branch passage 39 with a port in the seat of the main slide valve 21.

The service portion also includes a release insuring valve device comprising a diaphragm 41, subject on one side to the pressure of the fluid in the chamber 37, which when the valve is in service, is the same as the pressure of the fluid in the brake pipe, and which is subject on the other side to the pressure of the fluid in the chamber 43, which is connected by way of the passage 44 with the valve chamber 17. The diaphragm 41 controls a valve 45 which is normally urged to seated position by a spring 47, and which controls communication between the chamber 43 and a passage 48 having a choke 48a interposed therein. The passage 48 leads to a port in the seat of the main slide valve 21, and which, in one position of the slide valve 21, is connected by means of the cavity 49 in the slide valve with a passage 50 which leads from the seat of the slide valve to a port in the face of the body of the valve portion.

The service portion also includes a limiting valve device comprising a diaphragm 52 subject on one side to the pressure of a spring 53 which is mounted in the chamber 54 which communicates with the atmosphere by way of a passage 55. The diaphragm 52 is subject on the other side to the pressure of the fluid in the chamber 56 which communicates with a port on the face of the valve body by way of passage 57. This passage when the valve portion is in service communicates with the brake cylinder. The diaphragm 52 controls a valve 58 which is engageable with a seat rib 59 and which controls communication between a chamber 60 and the chamber 56, while a backflow check valve 61 controls communication between the chamber 60 and a passage 62, having a choke 62a interposed therein, which leads from a port in the seat of the slide valve 21, and which, in one position of the slide valve, is connected by way of the cavity 63 with the passage 39.

The service portion also has associated therewith a duplex release valve device comprising a valve element 65, which is urged to its seat by a spring 66, and controls communication between a chamber 68 and the atmosphere. The chamber 68 is connected by way of passage 70 with the valve chamber 17. The release valve device also includes a valve element 71 which is urged to its seat by spring 72 and controls communication between a chamber 73 and the atmosphere. The chamber 73 is connected by way of the passage 74 with a port in the seat of the slide valve 21 and with a port in the face of the body of the valve portion, which when the valve portion is in service communicates with the emergency reservoir. The valve elements 65 and 71 are moved away from their seats by means of the plunger 76 which has a pair of stems 77 and 78 which are engageable with the valve elements, while the plunger 76 is actuated by the handle 79.

The valve body has a pair of feed grooves 80 and 81 formed therein and communicating with the piston chamber 15 and the valve chamber 17. The feed groove 81 is somewhat shorter than the feed groove 80, and is arranged so that communication between the piston chamber 15 and the valve chamber 17 through the feed groove 81 is cut off when the piston 16 is moved to the extreme left hand position as viewed in Fig. 1 of the drawings.

The service portion body also has a passage 83 formed therein, and communicating with a port on the face of the body portion and with a port in the seat of the slide valve 21. When the valve device is in service this passage communicates with the brake cylinder.

The service portion also includes a quick service volume 86 which communicates with a port in the seat of the slide valve 21 by way of the passage 88, and with the atmosphere by way of the passage 89 which has the choke 85 interposed therein.

The emergency portion comprises a piston 100 having a piston chamber 101 at one side thereof and having a valve chamber 102 at the other side thereof. The valve chamber contains a main slide valve 103, and an auxiliary or graduating slide valve 104 which are adapted to be operated by the piston 100 through the piston stem 106.

The valve chamber 102 also contains a return piston 107 which is engaged by the end of the piston stem 106 and is urged toward the right, as viewed in Fig. 2 of the drawings, by the spring 109. The piston stem has a plunger 110 associated therewith and engageable with the end of the main slide valve 103. Movement of the plunger 110 is opposed by the spring 111.

The emergency portion also has associated therewith an accelerated release piston 114, which is subject on one side to the pressure of the fluid in the valve chamber 102, and which is subject on the other side to the pressure of the fluid in the chamber 115, which is connected to a port in the seat of the slide valve 103 by way of the passage 116 which has a choke 117 interposed therein. A plunger 118 is carried by the piston 114 and this plunger is urged to the right, as viewed in Fig. 2 of the drawings, by means of the springs 119 and 120 which extend between the piston 114 and a washer or disk 121 fitted on the plunger 118.

The emergency portion has a vent valve device associated therewith and comprising a piston 125, which is subject on one side to the pressure of the fluid in the chamber 126 which communicates by way of a passage 127 with a port in the seat of the slide valve 103. The chamber 126 also communicates with the atmosphere by way of a passage 128, while the piston 125 is adapted to engage a seat rib on a gasket 130 to cut off communication between the chamber 126 and the passage 128, except for communication through a restricted passage 131 extending through the piston. The emergency portion body has the groove 133 formed therein, which permits communication from the chamber 126 around the piston 125 when the piston is in the position shown in Fig. 2 of the drawings.

The piston 125 has a stem 135 formed integral therewith and this stem has a valve 136 mounted on the end thereof. The valve 136 is held in engagement with a seat rib 138 by means of a spring 139 so as to cut off communication between a chamber 140 and the atmospheric passage 128. The chamber 140 communicates with a port on the face of the emergency valve portion body by way of a passage 141. The valve 136 has a port 142 formed therein which, when the valve 136 is in the position shown in Fig. 2 of the drawings, permits communication between the passage 141 and the chamber 140.

The emergency portion also includes an accelerated release check valve device comprising a ball check valve 145 which engages a seat formed on the body of the valve device and the valve element 146 which is held in engagement with a seat rib 147 by means of a spring 148. The valves 145 and 146 control communication between the passage 150, which leads from a port in the seat of the slide valve 103, and the valve chamber 151 which communicates with the passage 141 by way of a passage 152.

This valve portion also has associated therewith a spill-over check valve device comprising a ball check valve 155 engageable with a seat formed on the body of the valve portion and a valve element 156 which is normally held in engagement with a seat rib 159 by means of a spring 158. The valves 155 and 156 control communication between the valve chamber 102 and the chamber 160 by way of a restricted port 161. The chamber 160 communicates with a port in the seat of the slide valve by way of a passage 162, which also communicates with a port in the face of the valve body.

The valve chamber 102 communicates with a port on the face of the valve body by way of the passage 165. The passage 165 communicates with the piston chamber 101 on the right hand side of the piston 100 by way of the charging choke 166, and communication between the passage 165 and the piston chamber 101 through the choke 166 is cut off when the piston 100 is moved to the right from the position in which it is shown in Fig. 2 to the emergency position, which is the position in which the piston is shown in Fig. 15 of the drawings.

An atmospheric exhaust passage 170 is provided which communicates with a port in the seat of the slide valve 103 and with the exhaust passage 128.

The emergency portion has an inshot piston device associated therewith and comprising a piston 175, which is mounted in a chamber 176, and which is normally urged into engagement with a seat rib 178 by means of a spring 177. Communication between the chamber 176 and the chamber 179 outwardly of the seat rib 178 is established by way of the groove 180. When the piston 175 is moved to the extreme left hand position, as viewed in Fig. 2 of the drawings, the annular rib 181 on the piston engages the gasket 183 so as to cut off communication between the piston chamber 176 and the chamber 179 outwardly of the seat rib 178. The piston 175 is subject on the side opposite from the spring 177 to the pressure of fluid in the chamber 185 which communicates by way of the passage 186 with the chamber 188, and by way of passage 189 with the passage 190 which communicates with a port on the face of the body portion.

The piston 175 has a stem 195 associated therewith and having a valve element 196 fitted on the end thereof. The valve element 196 is adapted to engage the seat rib 198 to control communication between a chamber 199 and the chamber 188 by way of passage 200. The valve element 196 is normally urged into engagement with the seat rib 198 by means of a spring 201. A restricted passage is provided between the chamber 199 and the chamber 188 by way of the choke 203.

The chamber 176 communicates with a volume chamber 192 by way of the passage 193, while the chamber 192 communicates with a port in the seat of the slide valve 103 by way of the passage 194.

The emergency valve section has a timing valve device associated therewith and comprising a diaphragm 210, which is subject on one side to the pressure of the fluid in the chamber 211 which communicates by way of the passage 212 with the slide valve chamber 102. The diaphragm 210 has a valve 214 associated therewith, and normally held in engagement with a seat rib 215 so as to cut off communication between the chamber 217 inwardly of the seat rib 215 and the chamber 218 outwardly of the seat rib 215. The chamber 218 communicates with the passage 190 through a choke 220, while the chamber 217 inwardly of the seat rib 215 communicates with a port on the face of the valve body by way of the passage 222, which has a branch passage 223 leading therefrom and communicating with a port on the seat of the slide valve 103. The diaphragm 210 is urged to the left, as viewed in Fig. 2 of the drawings, by the pressure of the fluid in the chamber 217 inwardly of the seat rib 215 and by the pressure of the fluid in the chamber 218 outwardly of the seat rib 215, and is urged to the right as viewed in Fig. 2 of the drawings by the pressure of the fluid in chamber 211.

The sectional views of the service and emergency portions of the valve device shown in Figs. 1 and 2 of the drawings are diagrammatic and, as actually constructed, the ports on the faces of these valve portions are not arranged in the same plane as shown in these figures of the drawings, but are arranged around the piston chambers in each of the valve devices. The arrangement of the ports which is employed in the actual construction of the service portion of the valve device is shown in Fig. 3 of the drawings, the ports being identified by reference numerals which correspond to the numerals employed on the passages leading to these ports. Similarly, the arrangement of ports employed in the actual construction of the emergency portion of the valve device is shown in Fig. 7 of the drawings, these ports being identified by reference numerals which are the same as the numerals employed on the passages leading to these ports.

Each of these valve portions has, in addition to the ports formed in the face thereof, a plurality of bolt holes extending therethrough and indicated on the face of the service portion in Fig. 3 by reference numerals 230, and on the face of the emergency portion in Fig. 7 by the reference numerals 235. Bolts, by means of which the valve portions are secured to the pipe bracket, extend through these holes.

The test apparatus provided by my invention employs a bracket member which is shown diagrammatically in Figs. 1 and 2 of the drawings, and is shown in greater detail in Fig. 10 of the drawings. The bracket member is indicated generally by the reference character 250, and has a face 251 having a plurality of ports therein which communicate with passages in the body of the bracket to which are attached pipes which communicate with the test apparatus in a manner to be described in detail below.

The bracket 250 is provided with a foot portion 253 by means of which the bracket may be secured to a support such as the top of a bench.

In the diagrammatic showings of the bracket member in Figs. 1 and 2, the passages are shown as extending directly through the bracket member, but in the actual construction employed, the face 251 of the bracket member is located on one side of the bracket member, and the passages in the member are curved and are carried out of the bracket at the back of the member, thus leaving the face of the member opposite the face 251 free of pipes.

The bracket member 250 has a substantially centrally located opening 255 formed therein and extending through the member. The area surrounding the end of this opening opposite the face 251 is closed by a cover indicated generally by the reference character 260, and, as best shown in Fig. 10 of the drawings, the cover comprises a cup-shaped member having a cylindrical portion and a closed end portion 262. The cylindrical portion is provided with a plurality of openings or windows, as indicated at 265, and has fitted therein a substantially tubular member 267 formed of a suitable transparent material, such as glass. An annular gasket 268 is positioned between the inner end of the glass member 267 and the cover 260, while a gasket 269 is positioned between the opposite end of the transparent member 267 and the face of the bracket member 250.

Means is provided to detachably secure the cover 260 in place, and this means comprises a yoke 271 pivotally secured by means of bolts 273, on ears 274 which project from the bracket member 250. The yoke 271 has a hand wheel 275 associated therewith, which is mounted upon a threaded stem 276 which is fitted in a threaded opening in the yoke 271, and which has a rounded end portion 277 which is adapted to engage a curved recess in the face of the cover 260. When the hand wheel 275 is turned so as to press the end 277 against the cover 260, the cover 260 is held firmly in place on the face of the bracket 250, and the gasket 269 serves to prevent the escape of fluid from the chamber defined by the cover to the atmosphere.

When it is desired to remove the cover, the hand wheel 275 is revolved in a direction to move the end 277 of the threaded stem away from the cover 260. When the end of the stem has been moved out of engagement with the cover, the yoke 271 is pivoted on the bolts 273 so as to be moved out of the way of the cover 260. The cover can then be removed.

The opening 255 through the bracket member is positioned so as to be substantially in alignment with the piston of the valve devices to be tested when these devices are secured to the bracket member. Suitable piston stop stems of the type shown in Fig. 11 of the drawings are provided, and each comprises a stem 280, having a threaded end portion 281 adapted to be screwed into a threaded opening in the face of the piston of the valve device. The stem 280 then extends through the opening 255 in the bracket member, and has an annular portion of reduced diameter, indicated at 282, adjacent the other end thereof, and having a slot 285 in the end.

The annular groove 282 is adapted to receive a horseshoe or locking member 287 which engages the face of the bracket 250, as shown in Fig. 10 of the drawings, to prevent movement of the piston stem 280 upwardly beyond a predetermined position, as viewed in Fig. 10 of the drawings.

The relative position of the piston stop stem and therefore of the piston to which the stem is secured, may be determined by the operator by observing the position of the piston stop stem through the windows which are provided in the cover 260.

The bracket member 250 has a plurality of passages extending therethrough, these being shown diagrammatically in Figs. 1 and 2 of the drawings as being arranged in a single plane. The actual arrangement of ports employed is shown in Fig. 6 of the drawings.

The passages in the bracket member are identified by the reference numerals 291 to 298, inclusive, and the ports associated with these passages are indicated in Fig. 6 of the drawings by similar reference characters.

The bracket member 250 is also provided with a plurality of apertures 301 extending therethrough, as shown in Fig. 6 of the drawings, and adapted to receive bolts associated with the filling pieces as described in detail below, the bolts being shown in section.

The testing apparatus provided by my invention comprises a plurality of reservoirs including a reservoir 320, which is analogous to the auxiliary reservoir employed on a railway vehicle, a reservoir 321 which is analogous to the emergency reservoir employed on a railway vehicle, and a reservoir 322 which is analogous to a brake cylinder. A reservoir 325 which is analogous to the main reservoir employed upon a locomotive is also provided, and is normally maintained charged to a pressure of 80 pounds with fluid under pressure supplied through a feed valve 326 from any suitable source of fluid, such as the supply reservoir 327.

The test apparatus also includes a reservoir 329 which is analogous to the brake pipe on a railway vehicle, and a reservoir 330 which is analogous to the quick action chamber which is incorporated in the pipe bracket portion of a valve device of the type which this apparatus is designed to test.

A pair of operating valves are provided to control the supply and release of fluid under pressure to and from various portions of the test apparatus. These operating valves are indicated by the reference numerals 335 and 336, and may be of any suitable well known construction.

The operating valve 335 is connected with the main reservoir by way of the pipe 340, and is connected with the brake pipe reservoir 329 by way of the pipe 341, and is provided with an atmospheric exhaust passage 342. The operating valve 335 is provided with an operating handle 338 which may be moved to eight operating positions, including positions Nos. 1 and 2 in which fluid under pressure is supplied to the brake pipe reservoir 329 through the pipe 341, the communication through the valve between the main reservoir and the pipe leading to the brake pipe reservoir being through a ¼" port when the operating handle 338 is in the No. 1 position, and being through a $\frac{1}{32}$" port when the operating handle is in the No. 2 position. The valve is constructed so that when the handle is moved to the No. 3 position, the flow of fluid to and from the brake pipe reservoir, and from the main reservoir is cut off. This may be termed the lap position of the valve.

The operating valve 335 has a plurality of positions in which fluid may be released from the brake pipe reservoir 329 through a graduated series of ports, these positions being identified as positions Nos. 4 to 8 inclusive. In the No. 4 position the brake pipe reservoir 329 communicates with the atmosphere by way of the atmospheric exhaust passage 342 through a $\frac{1}{32}$" port, while in the No. 5 position, the brake pipe reservoir communicates with the atmosphere through a port formed by a No. 45 drill (.082" in diameter), and in the No. 6 position, the brake pipe reservoir is connected to the atmosphere through a port formed by a No. 32 drill (.116" in diameter). In the No. 7 position of the operating valve 335, the brake pipe reservoir is connected to the atmosphere through a port formed by a No. 27 drill (.144" in diameter), and in the No. 8 position the brake pipe reservoir is connected to the atmosphere through a $\frac{9}{32}$" port.

The operating valve 336 controls passages leading to the upper and lower ends of the manometer which is indicated generally by the reference character 350. The valve 336 is connected with the pipe 341 leading to the brake pipe reservoir 329 by way of the pipe 351, and is connected with the auxiliary reservoir 320 by way of the pipes 352, 440, and 442. A pipe 353 connects the pipe 340 leading from the main reservoir 325 with a chamber in the valve 336 above the rotary valve element employed in the valve so as to maintain the rotary valve element against its seat. In addition the valve 336 is provided with an atmospheric exhaust passage 355, and has a pipe 357 associated therewith and connected to the upper end of the manometer 350, and a pipe 358 which is connected to the lower end of the manometer 350.

The valve 336 is provided with an operating handle 339 which is movable between two positions, one of these positions being the cut-in position in which the top of the manometer is connected to the auxiliary reservoir 320, and the bottom of the manometer is connected to the brake pipe reservoir 329. The other position of the handle 339 is the cut-out position and in this position of the handle the top and bottom of the manometer are connected to the atmosphere.

As shown in the drawings the manometer 350 comprises a bottom tank 361 adapted to hold a quantity of liquid, such as water, and a top tank 362 which is also adapted to hold a quantity of liquid, the top and bottom tanks being connected by means of a transparent conduit, such as a glass tube 365.

The top and bottom tanks 361 and 362 are pressure tight so that the fluid under pressure supplied by the pipes 357 and 358 establishes a pressure in the tanks which is operative on the liquid in the device. On an increase in the pressure of the fluid in the bottom tank, liquid from this tank is forced up into the glass tube joining the top and bottom tanks, the level to which the liquid is forced being determined by the difference in the pressures in the two tanks. In this manner the difference in the pressures present in the top and bottom tanks and in the chambers to which these tanks are connected may be determined.

The brake pipe reservoir 329 is connected with the passage 298 in the bracket member 250 by way of the pipe 370, and the pressure of the fluid in the pipe 370 and the reservoir 329 is indicated by the gage 371.

The quick action chamber reservoir 330 is connected with the passage 297 in the bracket member 250 by way of a pipe 373. Communication between the quick action chamber reservoir and the pipe 373 is controlled by means of the valve 375. A gage 376 is connected to the quick action chamber reservoir 330 and registers the pressure of the fluid in this reservoir.

The pipe 352 leading from the valve 336 communicates with the pipe 373 at a point intermediate the valve 375 and the bracket member 250, and communication through this pipe is controlled by means of the valve 377. A valve 378 controls a passage leading to the atmosphere from the pipe 352 at a point intermediate the valve 377 and the bracket member.

A pipe 380 is also provided and communicates with the pipe 370 and with the pipe 352 at a point intermediate the valve 377 and the operating valve 336, and communication through this pipe is controlled by means of the valve 382. A valve 384 is provided and controls communication through a passage communicating with the atmosphere and with the pipe 352 at a point intermediate the valve 377 and the operating valve 336. A gage 386 is provided and communicates with the pipe 352 at a point intermediate the valve 377 and the operating valve 336, and indicates the pressure of the fluid in this portion of the pipe 352, and also in the auxiliary reservoir 320 which is connected with the pipe 352 by way of the pipe 440. The pipe 388 connects the passage 296 in the bracket member 250 with the pipe 380 at a point intermediate the valve 382 and the pipe 370. A valve 390 is interposed in this pipe and controls communication through the pipe, while a gage 391 is associated with the pipe 388, being connected thereto at a point intermediate the valve 390 and the bracket member 250, to indicate the pressure of the fluid in the pipe 388.

A gage 395 is also provided and communicates with the pipe 340 at a point intermediate the main reservoir 325 and the operating valve 335 to indicate the pressure of the fluid in this portion of the pipe 340. The pipe 398 is connected with the passage 295 in the bracket member 250 and extends between the bracket member and the pipe 340. Communication through this pipe is controlled by valves 399 and 400, while a valve 401 is provided and controls a passage communicating with the atmosphere and with the pipe 398 at a point intermediate the valve 399 and the bracket member 250. The valve 401 is provided with a terminal member 403 having an opening therein adapted to receive the nozzle of the leakage indicator shown in Fig. 13 of the drawings. A gage 405 is provided and communicates with the passage 398 at a point intermediate the valve 399 and the bracket member 250 and indicates the pressure of the fluid in this portion of the pipe 398.

A pipe 408 communicates with the emergency reservoir 321 and with the pipe 398 at a point intermediate the valves 399 and 400.

The passage 294 in the bracket member 250 has a pipe 410 associated therewith, and communication through this pipe between the passage in the bracket member and the atmosphere is controlled by means of a valve 411. This valve has a terminal member 412 associated therewith having an opening therein adapted to receive the nozzle of the leakage indicator.

A pipe 414 is connected with the passage 293 in the bracket member and with the pipe 340, communication through the pipe 414 being controlled by means of valves 416 and 418. The brake cylinder reservoir 322 communicates with the pipe 414 at a point intermediate the valves 416 and 418 by way of a pipe 420.

A valve 421 is provided and controls communication between the atmosphere and the pipe 414 at a point intermediate the valve 416 and the bracket member 250. The valve 421 has a terminal member 422 associated therewith having an opening therein adapted to receive the nozzle of the leakage indicating device. The valve 424 controls communication between the atmosphere and the pipe 414 at a point intermediate the valves 416 and 418. A gage 425 communicates with the pipe 414 at a point intermediate the valve 416 and the bracket member 250 and indicates the pressure of the fluid in this portion of the pipe 414.

A pipe 428 extends between the passage 292 in the bracket member 250 and the pipe 420, and communication through this pipe is controlled by the valve 429. A gage 430 is connected with the pipe 428 at a point intermediate the valve 429 and the bracket member and indicates the pressure of the fluid in this portion of the pipe 428. A branch pipe 431 communicates with the pipe 428 at a point intermediate the valve 429 and the bracket member 250 and with the pipe 340, communication through this pipe being controlled by means of a valve 432.

The passage 291 in the bracket member 250 has a pipe 440 associated therewith and communicating with the pipe 352 at a point intermediate the valve 377 and the operating valve 336. A pipe 442 communicates with the pipe 440 and with the auxiliary reservoir 320, communication through this pipe being controlled by means of the valve 443.

The pipe 340 has a valve 451 interposed therein at a point intermediate the pipe 445 leading from the main reservoir 325 and the pipe 431. A valve 450 controls communication between the pipe 340 and the atmosphere at a point intermediate the valve 451 and the pipe 431.

Communication between the main resevoir 325 and the pipe 340 is controlled by means of a valve 445, while communication between the feed valve device 326 and the main reservoir 325 is controlled by means of a valve 447. The valves 445 and 447 remain open at all times during operation of the test apparatus provided by this invention.

In order to adapt this apparatus to test either a service portion of the brake controlling valve device or an emergency portion of the brake controlling valve device, a pair of filling pieces or adapters are provided, and these are adapted to be interposed between the face 251 of the bracket member 250 and the valve portion to be tested. These filling pieces are indicated by the reference numerals 475 and 476, the filling piece 475 being adapted for use in testing the service portion of a valve device, and the filling piece 476 being adapted for use in testing the emergency portion of a valve device.

As is shown in the drawings, the filling piece 475 comprises a substantially flat body having generally parallel faces, and having a plurality of passages extending therethrough adapted to communicate with ports in opposite faces of the body. This filling piece has a plurality of threaded openings 478 therein, (see Figs. 4 and 5), in which are secured bolts, shown in section, which are adapted to extend through the openings 301 in the bracket member 250 (see Fig. 6) by means of which the filling piece 475 is secured in place against the face 251 of the bracket member.

In addition, the filling piece 475 has threaded openings, 479 formed therein, (see Figs. 4 and 5), in which are adapted to be secured bolts, shown in section, which extend through the bolt holes 230 in the service portion of the valve device (see Fig. 3) to hold this portion against the face of the filling piece. Suitable gaskets 480 and 481 are positioned between the body of the valve device and filling piece, and between the filling piece and the face of the bracket member to prevent the escape of fluid under pressure through the joints between these members.

The passages in the filling piece 475 include a passage 485 which is adapted to communicate with the passage 38 in the service portion of a valve device, and with the passage 298 in the bracket member. This passage communicates with ports on opposite faces of the filling piece, these ports being identified, in Figs. 4 and 5 of the drawings, by the same reference numeral as is employed for the passage.

The filling piece 475 has a passage 486 extending therethrough and adapted to communicate with the passage 48 in the service portion of a valve device, and with the passage 297 in the bracket member 250. The ports on the face of the filling piece which are joined by this passage are identified, in Figs. 4 and 5 of the drawings, by the reference numeral employed for the passage.

The passage 487 extends through the filling piece 475 and communicates with the passage 34 in the service portion of the valve device, and with the passage 296 in the bracket member. The passage 487 has a branch passage 488 associated therewith and communicating with the central opening 500 in the filling piece through which extends the piston stop stem 280, and which is in communication with the piston chamber 15.

The passage 489 extends through the filling piece and communicates with the passage 74 in the valve portion and with the passage 295 in the bracket member 250. The passage 490 in the filling piece communicates with the passage 50 in the valve device, and with the passage 294 in the bracket member, while the passage 491 in the filling piece communicates with the passage 83 in the service portion of a valve device and with the passage 293 in the bracket member. The passage 492 in the filling piece communicates with the passage 57 in the valve device to be tested, and with the passage 292 in the bracket member, while the passage 493 in the filling piece communicates with the passage 20 in the valve device and with the passage 291 in the bracket member.

As will be seen in Fig. 2 of the drawings, the filling piece 476 comprises a substantially flat body portion generally similar to that of the filling piece 475, and having a plurality of passages extending therethrough and adapted to communicate with ports in opposite faces of the body of the filling piece.

The filling piece 476 has a plurality of threaded openings 510 formed therein, (see Figs. 8 and 9), which are adapted to have secured therein bolts, shown in section, which extend through the holes 301 in the bracket member 250 in order that the filling piece 476 may be secured in place against the bracket member.

In addition the filling piece 476 has a plurality of threaded openings 512 formed therein and adapted to receive bolts, shown in section, which extend through the bolt holes 235 in the emergency valve portion in order to hold the valve portion in position against the face of the filling piece. Suitable gaskets 514 and 515 are interposed between the valve portion and the face of the filling piece and between the filling piece and the face of the bracket member to prevent the escape of fluid under pressure at these points.

The filling piece 476 has a passage 516 extending therethrough and adapted to communicate with the passage 141 in the emergency portion of the valve device and with the passage 296 in the bracket member 250, the ports in the faces of the filling piece with which this passage communicates being identified in Figs. 8 and 9 of the drawings by the same reference character as is employed for the passage. A branch passage 517 communicates with the passage 516 and with the central opening 525 in the filling piece through which extends the piston stop stem 280a, and which is in constant communication with the piston chamber 101 in the valve device.

The filling piece 476 has a passage 518 extending therethrough and communicating with the passage 165 in the valve device and with the passage 297 in the bracket member.

A passage 519 is formed in the filling piece and is adapted to communicate with the passage 162 in the emergency portion of the valve device and with the passage 295 in the bracket member. A passage 520 is formed in the filling piece and communicates with the passage 190 in the valve device and with the passage 293 in the bracket member, while the passage 521 in the filling piece communicates with the chamber 199 in the emergency portion of the valve device and with the passage 292 in the bracket member 250. A branch passage 522 communicates with the passage 521 in the filling piece and with the passage 222 in the emergency portion of the valve device.

As is best shown in Fig. 2 of the drawings, when the emergency filling piece 476 is in position against the face of the bracket member 250, communication through the passages 291, 294 and 298 is cut off.

The filling piece 476 also has an arm 530 formed integral therewith and extending to a point opposite the atmospheric exhaust passage 128 in the emergency portion of a valve device, when this portion is in position against the face of the filling piece.

The arm 530 has a chamber 532 formed therein, one wall of this chamber being formed by the diaphragm 533. A plunger 536 is positioned adjacent the diaphragm so as to be engaged thereby, and has a stem 538 positioned in a bore 539 therein, the stem having a rounded end portion 540 which is adapted to engage a concave recess 541 in the sealing device 544 which is adapted to close the atmospheric exhaust passage 128 in the emergency portion of the valve device.

The sealing device 544 comprises a body 546 having an annular sealing member 547 secured on one face thereof by means of the member 548 which is screwed into a threaded opening in the body 546. The sealing member 547 is preferably constructed of a resiliently yieldable material, such as molded rubber, and has a generally conical outer face adapted to engage the wall of the emergency valve portion body surrounding the atmospheric passage 128. The body 546 has a passage 550 extending therethrough and has a pipe 551 screwed into a threaded opening in the end of the passage 550, and this pipe has a valve or cock 552 secured on the opposite end thereof and controlling communication through the passage in the sealing device. The passage leading from the valve 552 is proportioned so as to receive the nozzle of the leakage indicator shown in Fig. 13 of the drawings.

A passage 555 is formed in the filling piece 476 and communicates with the chamber 532 and with the passage 519.

In operation, the sealing device 544 is placed over the opening 128 and fluid under pressure is then supplied to the chamber 532 which operates on the diaphragm 533 so as to move the plunger 536 and cause the stem 538 to press against the body of the sealing device so that the sealing member 547 is pressed firmly against the body of the emergency valve portion surrounding the opening 128 and effectively seals this opening.

In Fig. 13, I have illustrated a leakage indicator adapted to be employed in connection with the test apparatus provided by this invention, and, as illustrated, this leakage indicator comprises a body 570 having a chamber 571 formed therein adapted to contain a quantity of liquid, such as water. The leakage indicator also includes a conduit 573 constructed of substantially transparent material such as glass. This conduit is mounted so as to extend in a substantially vertical plane and may be held in place and be protected by a housing member 575 having an opening or window 576 therein. The upper end of the conduit 573 is open to the atmosphere through the port 578 and the lower end of the conduit is in communication with the chamber 571 by way of the passage formed in the body 570. The conduit 573 may have a plurality of marks thereon indicated at 579 by means of which the level of the liquid in the conduit may be determined.

The chamber 571 has a passage 580 communicating therewith and with a flexible tubing 581, which may be constructed of any suitable material, such as rubber, and which has a nozzle or handle piece 582 secured on the other end thereof. The nozzle 582 is adapted to be held by the hand of the operator and has an end portion provided with a substantially conical portion 584 which is adapted to extend into and engage the wall surrounding the passage in the terminal pieces employed in connection with certain of these valves in the test apparatus provided by this invention.

In operation the nozzle of the leakage indicator is placed in the opening in the terminal member and is held firmly against the walls of this opening so that the conical member engages this wall to prevent leakage around the nozzle piece, and any fluid which flows through the passage of the terminal piece is carried by means of the conduit 581 to the passage 580 and therefrom to the chamber 571. As the pressure in the chamber 571 builds up, the liquid in this chamber is forced from the chamber through the passage leading to the conduit 573 to cause the level of the liquid in this conduit to rise. The amount of leakage through the terminal member, and accordingly, the leakage into the passage with which the terminal member is associated, may be determined by observing the extent of the rise of the liquid in the conduit 573.

In the preferred arrangement of the testing apparatus provided by this invention the entire apparatus is mounted upon a work bench or rack having a shelf on which the bracket member 250 is secured, and having a panel at the back of this shelf on which the gages and valves employed in the device are mounted in order that the valves may be reached readily and the gages read easily.

In the preferred embodiment, the piping connecting the valves and gages with each other and with the reservoirs and with the bracket member 250 is mounted behind the panel on which the gages and valves are mounted so as to provide a test stand which is attractive in appearance, while the reservoirs employed in the system may be placed beneath the shelf on which the bracket is mounted so that the entire testing apparatus forms a compact unit.

The test stand also preferably has associated therewith a container for soap solution which is employed in certain of the tests to ascertain whether there is leakage in various parts of the valve portion being tested. The test stand also has mounted thereon, in a convenient location, a leakage indicator, one type of which is shown in detail in Fig. 13 of the drawings, the flexible hose 581 which is associated with the leakage indicator being long enough to reach the terminal members employed with certain of the valves in the test apparatus, the terminal members being mounted on the panel at the back of the shelf of the test rack.

The equipment provided with the test rack also includes a timing device such as a clock to indicate elapsed time, preferably in seconds, by means of which the time required for various tests may be quickly and accurately determined.

While any form of valve or cock may be employed in the test apparatus, I prefer to employ a valve of the type which can be moved from the closed to the full open position by a relatively short movement of the operating handle associated with the valve, and which, when in the closed position, will effectively cut off communication through the passage controlled by the valve, thereby eliminating leakage so that accurate and dependable test results will be secured.

A series of tests have been developed for the purpose of determining whether specific portions of the service and emergency portions of a brake controlling valve device are up to the proper standard of workmanship and general condition, and these tests will now be described in detail. The tests employed in connection with the service portion will be described first and will be followed by a description of the tests employed in connection with the emergency portion.

In order to test the service portion of the valve device, the service portion filling piece is secured in place against the face 251 of the bracket member 250, the gasket 481 being interposed between these members to prevent leakage. The piston stop stem 280 of the proper length is secured in the piston 16 of the valve device, and the valve device is then secured against the face of the filling piece, the gasket 480 being interposed between the body of the valve device and filling piece. When the valve device is in position the piston stop stem projects through the opening 500 in the filling piece and the opening 255 in the bracket member, and into the chamber formed by the cover 260. The test apparatus and the valve device are now substantially in the relationship shown diagrammatically in Fig. 1 of the drawings.

The testing of the service portion of the valve device is begun with all cocks or valves of the testing apparatus except the cocks 445 and 447 closed and with the handle 338 of the operating valve 335 in No. 8 position, in which position the flow of fluid under pressure from the main reservoir 325 through the pipe 340 to the brake pipe reservoir 329 is cut off, and the brake pipe reservoir is connected to the atmosphere through a port formed by a $\frac{3}{32}$" drill.

The handle 338 is now moved to the No. 1 position, in which air from the main reservoir 325 is supplied to the pipe 341 and therefrom to the brake pipe reservoir 329 through a ¼" port. In addition the cocks 390, 443, 399, 411, 400 and 382 are opened so that air from the main reservoir 325 flows through the valve 335 to the brake pipe reservoir 329, and therefrom by way of the pipe 380, the open valve 382 and the pipes 352 and 440 to the passage 291 in the bracket member 250, and therefrom through the passage 493 in the filling piece 475 to the passage 20 in the valve portion to the valve chamber 17. Fluid also flows from the pipe 440 through the open valve 443 and the pipe 442 to the auxiliary reservoir 320. Fluid also flows from the reservoir 329 by way of the pipes 379 and 380, the open valve 390 and the pipe 388 to the passage 296 in the bracket member and the passages 487 and 488 in the filling piece which communicate with the piston chamber 15.

In addition, fluid under pressure flows from the pipe 340 through the open valve 400 to the pipe 408 and therethrough to the emergency reservoir 321. When the auxiliary and emergency reservoirs are charged to the full 80 pound pressure, the valves 400 and 382 are closed. The pressure of the fluid in the auxiliary and emergency reservoirs may be determined by means of the gages 405 and 386.

The piston 16 and the slide valve 21 of the valve to be tested are now moved between the release and service positions several times by moving the operating handle 338 of the operating valve 335 between the positions No. 1 and No. 8 several times. This produces a variation in the pressure of the fluid in the chamber 15 which effects movement of the piston 16. The operating handle 338 is left in the No. 8 position, in which position the brake pipe reservoir 329 is connected to the atmosphere through a $\frac{3}{32}$" port. This permits fluid to flow from the piston chamber 15 to the atmosphere, and causes the piston 16 and the slide valve 21 of the valve device to be moved by the fluid in the valve chamber 17 to the extreme right, as viewed in Fig. 1 of the drawings, which is the service position. The piston and slide valve are then substantially in the position shown in Fig. 14 of the drawings.

At this time the valve 416 is opened which permits communication between the passage 83 in the valve device and the brake cylinder reservoir 322 by way of the passage 491 in the filling piece 475, the passage 293 in the bracket member 250, and the pipes 414 and 420. When the piston 16 is moved to the service position as shown in Fig. 14 of the drawings, the passage 83 of the valve device is in communication with the valve chamber 17 by way of a passage or port formed in the slide valve 21 so that the brake cylinder reservoir 322 is charged with fluid under pressure supplied from the valve chamber 17.

While the slide valve 21 is in this position, the nozzle of the leakage indicator 570 is inserted in the opening in the terminal piece 412 associated with the valve 411 which communicates with the passage 50 in the valve portion, which when the slide valve is in the service position, as shown in Fig. 14 of the drawings, is in communication with the cavity 49 in the slide valve 21. The cavity 49 also communicates with the passage 48 leading from the release insuring valve device employed in this valve portion.

If there is any leakage of fluid through the release insuring valve device or past the slide valve 21, the fluid will flow through the pipe 410 and the valve 411 and will cause the water in the column 573 of the leakage indicator to rise. The amount of leakage into this passage may be determined by the rate of the rise of the water column in the leakage indicator, and in this manner it may be determined whether this portion of the valve is up to the proper standard of workmanship and general condition.

Leakage from the quick service exhaust port 85 may be detected by covering the exhaust port 85 with soapsuds. If there is leakage through the quick service volume 86 when the slide valve is in the service position, a bubble will be formed around the exhaust port, and the condition of the seat of the slide valve may be determined by observing the time required to form a bubble of predetermined dimensions.

The condition of the slide valve in the region of the passage 74 is now tested. This is accomplished by closing valve 399 and opening valve 401, and placing the nozzle of the leakage indicator 570 in the opening in the terminal member 403 associated with the valve 401. Leakage of fluid through the passage 74 will cause the water in the column 573 of the leakage indicator to rise, and the rate of this rise will indicate the relative condition of this portion of the slide valve seat.

The condition of the diaphragm 52 of the limiting valve device is now tested, this being accomplished by coating the exhaust port leading from the passage 55 with soapsuds. If there is any leakage through the diaphragm 52 of the chamber 56 a bubble will form.

For the next test the valves 443, 416 and 399 are closed, thus cutting off the auxiliary reservoir 320, the brake cylinder reservoir 322, and the emergency reservoir 321 from the valve portion being tested. The pressure registered on the gage 425 is now noted. This pressure is the same as the pressure in the valve chamber 17, as the pipe 414 is in communication with the chamber 17 by way of the passage 293 in the bracket member 250, the passage 491 in the filling piece 475, the passage 83 in the valve device, and the port through the slide valve 21. The rate of decrease registered on this gage is observed, this indicating the escape of fluid from the valve chamber 17. Fluid may escape from the valve chamber 17 because of a leak in the diaphragm 41 of the release insuring valve device, by leakage past the ring employed on the piston 16, or by leakage past the valve element 65 of the duplex release valve device.

Similarly, the pressure registered on the gage 405 is observed for a limited period. A reduction in pressure registered on this gage will be caused by leakage past the valve element 71 of the duplex release valve device employed with this brake valve portion.

The valves 429 and 424 are now opened and fluid under pressure released through the valve 424 from the brake cylinder reservoir 322 until the pressure registered on the gage 425 drops to a predetermined low value at which time the valves 424 and 429 are closed.

When the valve 429 is open the brake cylinder reservoir is in communication with the chamber 56 associated with the limiting valve employed in the brake valve device by way of pipes 420, 428, passages 292 and 492, and passage 57 in the body of the valve portion. When the pressure of the fluid in the brake cylinder reservoir 322 is reduced, the pressure of the fluid in the chamber 56 is similarly reduced, and this pressure is of such a value that it is insufficient to move the diaphragm 52 against the spring 53 with the result that the valve 58 is moved away from the seat rib which it is adapted to engage, and fluid is permitted to flow from the chamber 56 to the chamber 60.

After the valve 429 is closed, the pressure registered on the gage 430 is observed for a time interval, and leakage, which will result in a reduction in the pressure registered on this gage, will be due to leakage past the ball check valve element 61 to the passage 62, and therefrom to the cavity 63 in the slide valve 21 and to the passage 39 which communicates with the passage 38, which in turn is in communication by way of the passages 485 and 298 with the pipe 370 and the brake pipe reservoir 329. The brake pipe reservoir is at this time in communication with the atmosphere through the operating valve 335.

After the preceding test has been completed the valve 411 is closed, while the valves 443, 416, 399, 400, 429, 418 and 377 are opened. When the auxiliary reservoir 320 has been charged to the full pressure of 80 pounds permitted by the feed valve device 326, the operating handle 338 of the operating valve 335 is moved to the No. 3 or lap position, and valve 382 is opened. The entire service portion should now be covered with soapsuds to detect gasket leakage or undesired leakage at any other point in the valve portion.

After the completion of this test the operating handle 338 of the operating valve 335 is moved to position No. 1 in which fluid under pressure from the pipe 340, which communicates with the main reservoir 325, is permitted to flow to the brake pipe reservoir 329. The cocks or valves 400, 418 and 382 are now closed while the valve 378 is opened, and the pressure of the fluid in the auxiliary reservoir 320 is reduced to a predetermined low value at which time the valves 378 and 377 are closed. The valve 424 is now opened and the pressure of the fluid in the brake cylinder reservoir 322 is reduced to atmospheric pressure following which the valve 424 is closed. The valve 411 is now opened.

The operating handle 338 of the valve 335 is now moved to position No. 5 in which fluid under pressure from the brake pipe reservoir 329 is permitted to escape to the atmosphere through a port formed by a No. 45 drill. When the pressure of the fluid in the brake pipe reservoir 329 is reduced to a relatively low value, as indicated by the gage 371, the valve 416 is closed and the handle 338 of the operating valve 335 is moved to the No. 1 position.

As a result of this operation of the operating valve 335 the piston 16 and slide valve 21 of the valve service portion is moved to the charging position, and is substantially in the position in which it is illustrated in Fig. 1 of the drawings.

The hose nozzle of the leakage indicating device shown in Fig. 13 is now inserted in the opening in the terminal piece 412 associated with the valve 411 which is now moved into the open position, and the level of the liquid in the column 573 of the leakage indicator is observed to determine whether or not there is leakage through the slide valve seat with the slide valve in the position in which it is shown in Fig. 1 of the drawings.

The exhaust port 85 is now covered with soapsuds to detect slide valve or graduating valve leakage.

The valve 424 is now opened and the pressure of the fluid in the brake cylinder reservoir 322 is reduced to a relatively low value, such as 5 pounds, as indicated on the gage 430. The valves 429 and 424 are then closed and the gage 430 is observed for a time interval. An increase in the pressure registered by this gage will be due to slide valve leakage.

After the completion of the preceding test the valve 416 is opened and the handle 338 of the operating valve 335 is moved to position No. 5 to vent fluid from the brake pipe reservoir 329, and when this pressure has been reduced to a predetermined relatively high value, such as 68 pounds, as indicated by the gage 371, the handle 338 is moved to the No. 3 or lap position.

The valve 421 is now opened and the fluid in the brake cylinder reservoir 322 is permitted to escape until the pressure of fluid in this reservoir is reduced to a value substantially one-half that in the brake pipe reservoir, such as 30 pounds, at which time the valves 416 and 421 are closed.

The pressure indicated by the gage 425 is observed for a time interval and the decrease in the pressure registered by this gage indicates graduating valve leakage, and in some instances slide valve leakage.

The hose nozzle of the leakage indicator is now inserted in the opening in the terminal member 412 associated with the valve 411 to detect slide valve and release insuring valve leakage.

After the completion of the preceding test the exhaust port 85 leading from the quick service chamber 86 is coated with soapsuds to detect slide valve or graduating valve leakage.

The valve 416 is now opened and the handle 338 of the operating valve 335 is moved to a No. 5 position, and the brake pipe pressure reduced to substantially 40 pounds at which time the handle 338 is moved to No. 3 or lap position.

The piston 16 and slide valve 21 of the valve portion being tested are now in the lap position which is a position intermediate the position in which the piston and slide valve are shown in Figs. 1 and 14 of the drawings.

The gage 371 is now observed for a time interval for an increase in pressure in the reservoir 329, and such an increase may occur as a result of leakage past the ring on the piston 16, leakage past the back-flow check valve 61, or it may be due to slide valve leakage.

At the completion of this test the handle 338 of the operating valve 335 is moved to position No. 8 so as to release the fluid in the piston chamber 15 to the atmosphere. The cover 260 is now removed from the right hand side of the bracket member 250 as viewed in Fig. 1 of the drawings, and the horseshoe or locking member 287 is placed in the annular recess 282 adjacent the end of the piston stop stem 280. This can be done readily as the piston 16 will be moved to the extreme right position as viewed in Fig. 1, due to the reduction in the pressure on the right hand side of the piston, and the pressure of the fluid in the valve chamber 17 operating on the left hand side of the piston.

The cover 260 is now replaced and the handle 338 of the operating valve 335 is moved to the No. 1 position to supply fluid under pressure to the brake pipe reservoir 329. The apparatus is now in condition to test the packing or piston ring employed on the piston 16 for leakage.

In order to test the packing ring on the piston 16 for leakage, the valves 390, 443, 416, 399, 411 and 382 are opened, the other numbered cocks in the test apparatus being closed, and the operating handle 338 of the valve 335 is moved to the No. 1 position if it is not already in this position.

When the handle 338 of the operating valve 335 is moved to the No. 1 position, fluid under pressure is supplied to the piston chamber 15 and on an increase in the pressure of the fluid in this chamber, the piston 16 is moved to the left until the horseshoe or locking member 287 mounted on the piston stop stem 280 engages the face of the bracket member 250 opposite the face 251.

The piston stop stem 280 is of such a length that the horseshoe or locking member 287 will engage the bracket member to prevent further movement of the piston when the piston is in a position adjacent the service position, which is the position in which the piston is shown in Fig. 14 of the drawings. When the piston 16 is in this position communication between the piston chamber 15 and the valve chamber 17 through the feed grooves 80 and 81 is cut off.

The operating handle 338 is now moved to the No. 3 or lap position and the valves 378 and 377 are opened to reduce auxiliary reservoir and brake pipe pressure to a predetermined relatively high pressure, such as 60 pounds, whereupon the valves 378 and 377 are closed. Thereafter valves 411 and 382 are closed, and valve 424 is opened to drain the brake cylinder reservoir 322. The valve 424 is then closed.

The valve 384 is now opened, thereby opening a communication from the valve chamber 17 to the atmosphere by way of the passage 20 in the valve portion, the passage 493 in the filling piece 475, the passage 291 in the bracket member 250, the pipe 440 and the open valve 384. The gage 391, which is in constant communication with the piston chamber 15 by way of the passages 488 and 487 in the filling piece 475, the passage 296 in the bracket member 250, and the pipe 388, is now observed, and the amount of leakage past the packing ring employed on the piston 16 may be determined by noting the rate of drop in the pressure registered on the gage 391. At the completion of this test the valve 384 is closed and the valve 411 is open.

The release insuring valve device employed in this valve section is now tested, and to make this test the valves 390, 443, 416, 399 and 411 are opened, and the other numbered cocks or valves are closed, while the operating handle 338 of the operating valve 335 is in the No. 3 or lap position. The handle 338 is now moved to the No. 1 position, after which the valve 382 is opened so as to charge the brake pipe reservoir 329 and the auxiliary reservoir 320 to a pressure of 80 pounds. When the pressures in the reservoirs 329 and 320 have equalized, the handle 338 is moved to the No. 3 or lap position, while the handle 339 of the operating valve device 336 is moved to the cut-in position. The valve 382 is now closed. The level of the water in the manometer 350 should now be at the zero position.

The valve 450 should now be opened to release fluid under pressure from the auxiliary reservoir, and also from the valve chamber 17 which is in communication with the auxiliary reservoir by way of the passage 20 in the body of the valve device, passage 493 in the filling piece 475, the passage 291 in the bracket member 250, and the pipes 440 and 442. The reduction in the pressure of the fluid in the valve chamber 17 results in a pressure difference in the chambers 37 and 43 on opposite sides of the diaphragm 41, and causes this diaphragm to be moved to the left, as viewed in Fig. 1, to move the valve 45 away from its seat so that fluid is vented by way of the passage 48. Fluid which is discharged into the passage 48 flows to the atmosphere through the passage 50, the pipe 410, and the opened valve 411.

When the pressure of the fluid in the auxiliary reservoir 320 is reduced through the valve 450 the pressure in the top tank 362 of the manometer 350 is also reduced, as this has been placed in communication with the auxiliary reservoir on movement of the handle 339 of the valve device 336 to the cut-in position. At the same time the bottom tank 361 of the manometer is in communication with the brake pipe 370 and the pressure of the fluid in the brake pipe remains substantially constant during this test. By observing the level of the water in the manometer 350 at the time at which fluid is vented from the valve 411, which may be determined by observing the passage leading from the valve 411, or by a sudden rapid movement of the water in the manometer, the difference in the pressures in the brake pipe and in the auxiliary reservoir which is required to operate the release insuring valve device may be determined.

As soon as the release insuring valve device opens, fluid is vented from the valve chamber 17, which is in communication with the auxiliary reservoir, and also in the top tank 362, thereby further reducing the pressure in these chambers. Due to the reduction in the pressure in the chamber in the top tank 362 the pressure of the fluid operating on the liquid in the bottom tank 361 tends to force all of the liquid in this tank into the upper tank, and to prevent this occurrence, the valve 451 should be opened as soon as the release insuring valve device opens, while the valve 450 should be closed.

When the valve 451 is opened fluid under pressure is supplied from the main reservoir 325 to the auxiliary reservoir and to the valve chamber 17, and therefrom to the chamber 43 on the left hand side of the diaphragm 41.

The passage through the valve 451 is proportioned so as to be somewhat larger than the passage through the choke 48a through which the release insuring valve discharges fluid from the valve chamber 17. The pressure of the fluid in the valve chamber 17 is therefore increased and there will be a corresponding increase in the pressure of the fluid in the chamber 43, and as a result, the valve 45 will move to the closed position and fluid will no longer be released from the valve chamber 17.

With the valve 451 open the water in the manometer will tend to return to the bottom tank due to the increase in the pressure of the fluid in the valve chamber 17, and also in the top tank 362, which is connected to the valve chamber, and the release insuring valve should close and cut off the flow of fluid to the valve 411 before the water in the manometer reaches the initial position. If the water in the manometer falls below the initial position before the release insuring valve device closes it is an indication of excess friction in the release insuring valve.

After the completion of this test, the handle 339 of the valve 336 is moved to the cut-out position, while the valve 451 should be closed.

The valve 384 is now opened so as to release fluid from the auxiliary reservoir 320 to the atmosphere, and as soon as the release insuring valve device opens the valve 384 is closed. As soon as the release insuring valve is opened fluid will be released from the valve chamber 17 and also from the auxiliary reservoir 320 through the passage 48, the rate of flow through this passage being regulated or limited by the choke 48a, the capacity of this choke being determined by observing the rate of reduction in the auxiliary reservoir pressure which is indicated by the gage 386.

At the completion of this test the handle 338 of the valve device 335 is moved to the No. 8 position so as to release the fluid in the piston chamber 15. The cover 260 is now removed and the horseshoe or locking member 287 is removed from the piston stop stem 280, whereupon the cover 260 is replaced.

After the completion of the preceding test the valves 390, 443, 416, 399 and 411 are opened and the other valves are closed, while the operating handle 338 of the operating valve 335 is moved to the No. 1 position to supply fluid under pressure to the brake pipe reservoir 329. The valves 400 and 382 are now opened, and after the brake pipe reservoir 329 and the auxiliary reservoir 320 are charged to 80 pounds, the valve 382 is closed and the handle 338 is moved to the No. 4 position in which fluid under pressure is released from the brake pipe reservoir 329. On movement of the handle 338 to the No. 4 position, the service piston and graduating valve of the valve device under test must move to the service position and fluid must be released from the port 85 leading from the quick service cavity 86.

The discharge of fluid from the quick service port should last not less than a predetermined time interval, such as three seconds, and by observing the length of time during which fluid is exhausted from this port, the condition of this portion of the valve may be determined.

At the completion of the test the handle 338 is moved to the No. 1 position, in which fluid under pressure is supplied to the brake pipe reservoir 329, and the valve 382 is opened.

The next test is designed to determine the condition of the duplex release valve and is started with the valves 390, 443, 416, 399, 411, 400 and 382 open, and with the handle 338 of the valve 335 in the No. 1 position. The valves 443, 400 and 382 are now closed. The handle 79 is now moved the full extent of its travel, and causes the valve element 71 to be unseated so as to permit the release of fluid under pressure from the emergency reservoir 321 by way of the pipe 408, the open valve 399, the pipe 398, and the passages in the bracket member 250 and the filling piece 475. The reduction in the pressure of the fluid in the emergency reservoir 321 may be observed on the gage 405, and by observing the time required to effect a predetermined reduction in the pressure of the fluid in the emergency reservoir, the capacity of the emergency portion of the duplex release valve may be determined.

During the testing of the emergency portion of the duplex release valve fluid under pressure is retained in the auxiliary reservoir 320 because the valve 443 remains closed. At the completion of the test of the emergency section of the duplex release valve the valve, 399 is closed and the valve 443 is opened. The handle 79 of the duplex release valve is again moved the full extent of its travel, and the valve 65 being unseated, fluid is permitted to escape from the auxiliary reservoir 320 by way of the pipe 442, the open valve 443, and the pipe 440, together with the passages in the bracket member 250 and the filling piece 475.

The pressure of the fluid in the auxiliary reservoir 320 may be observed by means of the gage 386, and the capacity of the auxiliary section of the duplex release valve may be determined by observing the length of time required to effect a predetermined reduction in the pressure of the fluid in the auxiliary reservoir.

At the completion of this test the handle 338 of the valve 335 is moved to position No. 8 in which fluid under pressure is released from the brake pipe reservoir 329, and the valves 421, 399, 401 and 382 are opened. After the auxiliary, emergency and brake cylinder reservoirs are drained these valves are closed.

The next test is designed to determine the rate of charging of the auxiliary reservoir when the service piston is in the retarded charging position and is begun with the valves 390, 443, 416 and 411 open, the other numbered valves being closed, and the handle 338 of the valve 335 in position No. 8. The handle 338 is now moved to position No. 1 which effects a supply of fluid under pressure to the piston chamber 15 and causes the piston 16 to move to the extreme left hand position, as viewed in Fig. 1 of the drawings, in which position the feed groove 81 is closed and communication is established between the piston chamber 15 and the valve chamber 17 by way of the feed groove 80 only. Fluid under pressure will be supplied to the auxiliary reservoir 320 from the valve chamber 17, and the pressure of the fluid in the auxiliary reservoir may be determined from the gage 386. By observing the time required to effect a predetermined increase in the pressure of the fluid in the auxiliary reservoir, the operator can determine whether or not this portion of the valve under test is in the proper condition for service.

On completion of the preceding test the valve 382 is opened, and when the auxiliary reservoir 320 has been charged to 70 pounds pressure, this valve is closed, whereupon the valves 399 and 451 are opened. Fluid under pressure is now supplied from the valve chamber 17 to the emergency reservoir 321 by way of a restricted port in the slide valve 21, the passage 74 in the valve device, passage 489 in the filling piece 475, passage 295 in the bracket member 250, and the pipes 398 and 408.

The pressure of the fluid in the emergency reservoir may be determined from the gage 405, and by observing the length of time required to effect a predetermined increase in the pressure of the fluid in the emergency reservoir the condition of the valve may be determined.

At the completion of this test the valves 400, 424 and 382 are opened.

The next test is designed to test the application and release by-pass check valves. It is undertaken with the valves 390, 443, 416, 399 and 411 open, the other numbered valves being closed, and the handle 338 of the valve 335 in the No. 1 position.

To test the release by-pass check valve 30, valve 390 is closed and the handle 338 of the valve 335 is moved to the No. 5 position, and the pressure in the reservoir 329 is reduced to a predetermined pressure, such as 65 pounds, at which time the handle 338 is moved to the No. 3 or lap position.

The pressure in the brake pipe reservoir 329 is indicated by the gage 371 and the pressure in the pipe 388 is indicated by the gage 391.

The pipe 388 is in communication with the piston chamber 15 and the valve chamber 17 by way of the passage 487 in the filling piece 475, and a branch passage 488, and is in communication with the chamber 33 by way of the passage 34 in the valve being tested. On a release of fluid under pressure from the reservoir 329, fluid is released from the chamber 37 by way of the passage 38 and the pipe 370, and, on a reduction in the pressure in the chamber 37 below a predetermined amount below the pressure of the fluid in the chamber 33, the valve 30 will be unseated so that fluid will flow from the chamber 33 into the chamber 37. The pressure differential between the chambers 33 and 37 which is required to unseat the valve 30 may be determined by observing the pressures registered by the gages 371 and 391. In this manner it can be determined whether the release by-pass check valve 30 is operating properly.

Upon the completion of the preceding test the handle 338 of the valve 335 is moved to the No. 1 position so that fluid under pressure is supplied from the main reservoir by way of the pipe 340 to the pipe 341 leading to the brake pipe reservoir 329, and therefrom to the pipe 370 to the passage 38 in the valve device being tested. On an increase in the pressure of the fluid in the chamber 36, the application by-pass check valve 31 will be unseated and fluid will flow from the passage 38 to the chamber 33, and therefrom by way of the passage 34 in the valve device and the passages 487 and 488 in the filling piece 475 to the piston chamber 15, and then to the valve chamber 17 and to the auxiliary reservoir 320.

The pressure differential in the chambers 36 and 33 which is required to unseat the application by-pass check valve 31 may be determined by observing the pressures registered on the gages 371 and 391, and in this manner it can be determined whether or not the application by-pass check valve is functioning properly.

At the completion of this test the valves 390, 400 and 382 are opened, and when the auxiliary reservoir 320 is charged to 80 pounds pressure, the valves 400 and 382 are closed.

The next test is designed to check the rate of flow of fluid under pressure to and from the brake cylinder and is begun with the valves 390, 443, 416, 399 and 411 open, the other valves being closed, and the handle 338 of the valve 335 in the No. 1 position.

The handle 338 is now moved to the No. 6 position and the pressure of the fluid in the reservoir 329 reduced to a predetermined pressure, such as 55 pounds, whereupon the handle 338 is moved to the No. 3 or lap position.

When the handle 338 of the valve 335 is moved to the No. 6 position, fluid is released from the piston chamber 15 and the piston moves to the application position, in which position fluid flows from the auxiliary reservoir to the valve chamber 17, and therefrom through a port or passage in the slide valve 21 to the passage 83 in the valve device, and therefrom to the brake cylinder reservoir 322.

The pressure of the fluid in the reservoir 322 is indicated by the gage 425, and by observing the time required to produce a predetermined increase in the pressure of the fluid in the reservoir 322 the rate of flow of fluid to this reservoir may be determined.

The handle 338 is now moved to the No. 2 position so that fluid under pressure is supplied to the piston chamber 15, thereby causing the piston 16 to be moved to the release and charging position, which is the position in which it is shown in Fig. 1 of the drawings. When the piston 16 and slide valve 21 are in this position the passage 83, which communicates with the brake cylinder reservoir 322, is in communication with the passage 50 through the cavity 49 in the slide valve 21, and the passage 50 communicates with the atmosphere by way of the pipe 410 and the open valve 411.

The drop in the pressure in the brake cylinder reservoir 322 will be shown on the gage 425, and by observing the time required to produce a predetermined reduction in the pressure of the fluid in the brake cylinder reservoir 322, the condition of the release port associated with the brake cylinder may be determined. This tests the portion of the port employed when the piston is in the full release and charging position.

The handle 338 is now moved to the No. 1 position, thereby increasing the rate of flow of fluid under pressure to the brake pipe reservoir 329 and therefrom to the piston chamber 15, and causing the piston 16 to be moved to the retarded recharge position.

The brake cylinder reservoir 322 continues to discharge through the valve device and the rate of reduction can be determined by observing the gage 425. In this manner the operator can determine whether or not the passage through which the brake cylinder exhausts when the piston and slide valve are in the retarded recharge position is of the proper capacity.

On the completion of this test the valves 400 and 382 are opened, and when the auxiliary and emergency reservoirs are charged to the full pressure of 80 pounds these valves are closed.

The next test is designed to test the quick service limiting valve which controls communication between the brake pipe and the brake cylinder and is undertaken with the valves 390, 443, 416, 399 and 411 open, the other numbered valves being closed, and the valve handle 338 in the No. 1 position in which fluid under pressure is supplied to the brake pipe reservoir 329. The valve 416 is now closed and the valves 429 and 424 are opened. As soon as the brake cylinder 322 is reduced to atmospheric pressure the valve 424 is closed.

The handle 338 of the valve 335 is now moved to the No. 4 position to release fluid from the brake pipe reservoir 329 and from the chamber 15 at the face of the piston 16 until the service piston 16 moves to the service position, which will be indicated by the rapid rise in the hand on the gage 425. The handle 338 should then be moved to the No. 3 or lap position.

When the piston 16 moves to the service position (see Fig. 14), the passage 62, which communicates with the chamber 60, is connected by way of the cavity 63 in the slide valve 21 with the passage 39, which communicates with the passage 38 so that fluid under pressure flows from the brake pipe passage 38 to the chamber 60 and therefrom around the valve element 58, and thence to the chamber 56. From the chamber 56 the fluid flows through the passage 57 to the passage 492 in the filling piece 475 and therefrom through the passage 292, the pipe 428, and the open valve 429 to the brake cylinder reservoir 322. The pressure of the fluid in the brake cylinder reservoir 322 is indicated by the gage 425, and the operator by observing the time required to effect a predetermined increase in the pressure in the brake cylinder reservoir 322, can determine whether the restricted passage 62a in the passage 62 leading to the chamber 60 is of the proper capacity.

The only connection with the brake cylinder reservoir 322 at this time is by way of the passage 57 in the valve device, and, on an increase in the pressure of the fluid in the chamber 56 the diaphragm 52 will be flexed upwardly so as to move the valve 58 into engagement with the seat rib 59 in the body of the valve device and thereby cut off the flow of fluid from the chamber 60 to the chamber 56. The pressure of the fluid in the chamber 56 is the same as the pressure of the fluid in the brake cylinder reservoir 322 and this is indicated by the gage 430. The operator can determine the pressure required to close the quick service limiting valve by observing the gage 430, and in this manner can determine whether this portion of the valve device is in proper working order.

The valve 429 should now be closed so as to cut off communication between the pipe 428 and the brake cylinder reservoir 322, leaving the chamber 56 in communication with the pipe 428 which is of limited volume. The gage 430 should now be observed for a rise in pressure. The rise in pressure will be due to leakage of fluid under pressure from the chamber 60 to the chamber 56 around the valve element 58, and in a properly working valve there should be no leakage at this point.

The valve 429 should now be opened and the valve 424 should be opened so as to reduce pressure in the brake cylinder reservoir 322 a relatively small amount, such as one pound, whereupon the valve 424 should be closed. When the pressure of the fluid in the brake cylinder reservoir 322 is reduced, there will be a similar reduction in the pressure of the fluid in the chamber 56, and on this reduction, the diaphragm 52 should be biased downwardly by the spring 53 so as to move the valve 58 to the open position so that fluid will flow from the chamber 60 to the chamber 56 and therefrom to the brake cylinder reservoir to restore the pressure in the brake cylinder reservoir and to again close the quick service limiting valve.

The next test is designed to test the return spring 26 of the service portion of the valve device, and is begun with the valves 390, 443, 399, 411 and 429 open, the other numbered cocks or valves being closed, and the handle 338 of the valve 335 in the position No. 3, which is the lap position.

The handle 338 is now moved to the No. 1 position so as to supply fluid under pressure to the brake pipe reservoir 329, while the valves 400, 382 and 377 are open. After the auxiliary reservoir 320 is charged to the full pressure of 80 pounds, the valves 400 and 382 are closed. The valve 378 should be partly opened at this time. When the valve 378 is open, fluid under pressure is permitted to escape from the pipe 352, which is connected to the pipe 373 which communicates by way of the passage 297 in the bracket member 250 and the passage 486 in the filling piece 475 with the passage 48 in the valve device. The passage 48 communicates with a port in the seat of the slide valve 21, and when the slide valve is in the release position, as shown in Fig. 1 of the drawings, communication is established between the valve chamber 17 and the passage 48 by means of a port or passage in the slide valve. On opening of the valve 378, therefore, fluid is vented from the valve chamber 17, and on the reduction in the pressure of the fluid in the valve chamber 17, the piston 16 is moved by the pressure of the fluid in the piston chamber 15 to the left from the position in which it is shown in Fig. 1 of the drawings. On movement of the piston 16 to the left, the end of the piston stem 23 engages the piston 25 and moves this piston against the pressure of the spring 26.

The operator is able to observe movements of the piston 16 by watching the end of the piston stop stem 280 through the window 265 in the cover member 260. When the piston 16 is observed to move to the retarded recharge position, that is, to the position to the left of the position in which it is shown in Fig. 1 of the drawings, the pressure in the valve chamber 17, as indicated by the gage 386, and in the brake pipe line 388, as indicated by the gage 391, should be observed. The difference between these pressures is the pressure differential required to move the piston to the retarded recharge position.

The valves 378 and 377 should now be closed and the valve 451 opened, thereby permitting fluid to flow from the main reservoir 325 to the auxiliary reservoir 320 through the pipe 340, and also to the valve chamber 17 by way of the pipe 440 and the passages in the bracket member of the filling piece and the valve portion. On an increase in the pressure in the valve chamber 17 the piston 16 will be moved to the right, away from the retarded recharge position, movement in this direction being assisted by the spring 26. The pressure in the auxiliary reservoir, which is the same as that in the valve chamber 17, at the time the piston 16 moves away from the retarded recharge position, will be registered by the gage 386, and the pressure in the brake pipe at this time will be shown by the gage 391. The difference in the pressures acting on the piston 16 at the time the piston moves away from the retarded recharge position to the full charging position may then be observed by the operator to determine whether the valve is in the proper working condition.

At the completion of this test the handle 338 of the valve 335 should be moved to the No. 8 position to release fluid from the brake pipe reservoir 329, and the valves 443 and 399 should be closed so as to cut off the flow of fluid from the auxiliary and emergency reservoirs 320 and 321, respectively, while the valves 421, 401 and 424 should be opened. As soon as the brake cylinder reservoir 322 has been reduced to atmospheric pressure all of the valves should be closed.

The testing of the service portion of the valve device is now complete and the valve device should be removed from the bracket member 250, while the filling piece 475 should also be removed.

Having completed the testing of the service portion of the valve device, the operator may now proceed with the testing of the emergency portion of the valve device as the test equipment provided by this invention is adapted for use in testing both the service and emergency portions of the valve device.

In order to test the emergency portion of the brake controlling valve device, the filling piece 476 is secured against the face 251 of the bracket member 250, the gasket 515 being interposed between the filling piece and the face of the bracket member.

A suitable piston stop stem 280a is now secured in the threaded opening in the face of the piston 100 of the emergency valve section, and the emergency section is secured against the face of the filling piece 476, the gasket 514 being placed between the valve body and the filling piece. When the valve body is in this position, the piston stop stem 280a projects through the opening 525 in the filling piece 476, and also through the opening 255 in the bracket member 250.

The testing of the emergency portion is begun with all of the valves of the test apparatus closed and with the handle 338 of the valve device 335 in the No. 8 position. The handle 338 is now moved to the No. 1 position, in which fluid under pressure is supplied to the brake pipe reservoir 329, and the valves 390, 443, 399, 400, 382, 377 and 375 are opened. When the emergency reservoir 321 has charged to the full pressure of 80 pounds, the valves 382 and 377 are closed.

The emergency piston 100 should now be operated by moving the valve handle 338 to the No. 8 position, in which fluid under pressure is released from the brake pipe reservoir 329, and after the emergency piston moves to the emergency position, the handle 338 should be moved to position No. 1, in which fluid under pressure is supplied to the piston chamber 101 by way of the pipe 341, the brake pipe reservoir 329, the pipe 389 and the pipe 388.

The emergency piston should now be operated between the release position and the emergency position several times by alternately opening and closing the valves 378 and 377 in rapid succession. Finally close the valve 377 and open the valve 378, and, after the emergency piston moves to the release position, which may be determined by observing the end of the piston stop stem 280a through the windows in the cover member 260, open valves 421 and 382, and close valve 378 and open valve 377.

The hose nozzle 582 of the leakage indicator should now be inserted in the opening of the terminal member 422 associated with the valve 421, and the operator should observe the time required to produce a predetermined rise in the level of the water in the column 573 of the leakage indicator. Leakage of fluid into the pipe 414 may be due to leaks around the gaskets 514 and 515, or past the timing valve diaphragm 210, or beneath the slide valve 103.

On the completion of this test, valve 421 should be closed and the valve 432 opened. The atmospheric exhaust passage 128 should now be coated with soapsuds and the size of the bubble which is formed at the atmospheric end of this passage should be observed. The bubble will be due to leakage of fluid to the atmosphere through the passage 128 as a result of slide valve leakage, graduating valve leakage or vent valve leakage.

The valves 432 and 377 should now be closed and the valve 421 opened. The valve 378 should now be partially opened and the pressure of the fluid in the quick action chamber 330 should be maintained at a predetermined pressure, such as 65 pounds, as indicated by the gage 376.

The hose nozzle 582 of the leakage indicator should now be inserted in the opening of the terminal member 422 associated with the valve 421, and the time required to produce a predetermined rise in the level of the water in the column of the leakage indicator should be observed. The rise in the water in the column of the leakage indicator will be caused by slide valve leakage, or by leakage past the accelerated release check valve elements 145 and 146.

The valve 421 should now be closed and the valve 432 opened. The valve 378 should now be partially opened so as to maintain the pressure of the fluid in the quick action chamber 330 at a predetermined pressure, such as 65 pounds, so that the piston 100 is maintained in the accelerated release position, which is the position in which it is shown in Fig. 16 of the drawings.

The atmospheric exhaust passage 128 should now be coated with soapsuds, and if there is any leakage of fluid to the atmosphere through this passage a bubble will be formed. Fluid may escape through this passage as a result of leakage past the slide valve 103 or the graduating valve 104.

The valve 378 should now be closed, and the valve 377 should be opened, and after the quick action chamber 330 is charged to the full main reservoir pressure of 80 pounds, the entire emergency portion should be coated with soapsuds to detect gasket leakage.

At the completion of this test, close the valves 400, 382, 432 and 377, and open valve 416. The operating handle 338 should now be moved to position No. 8, and the valve 378 opened so as to drain the quick action chamber 330. The valves 378 and 375 should now be closed.

As a result of movement of the handle 338 to the position No. 8, fluid is released from the brake pipe reservoir 329 and from the piston chamber 101 by way of the passages 517 and 516 in the filling piece 476 and the passage 296 in the bracket member 250 and the pipe 388, through the open valve 390, and the pipe 380. This causes the piston 100 to be moved to the emergency position, which is the position in which it is shown in Fig. 15 of the drawings.

With the piston in the emergency position the exhaust port 128 should now be coated with soapsuds to detect leakage by the slide valve, the accelerated release piston 114, or past the emergency reservoir check valves 155 and 156.

The handle 338 should now be moved to the No. 2 position and should remain there until a relatively low pressure, such as 5 pounds, is obtained in the brake pipe reservoir 329, whereupon the handle 338 should be moved to the No. 3 or lap position. As a result of this increase in the pressure of the fluid in the brake pipe reservoir, there will be an increase in the pressure of the fluid in the piston chamber 101 and the piston 100 will be moved to the release position, which is the position in which it is shown in Fig. 2 of the drawings.

The exhaust port 128 should again be coated with soapsuds to detect vent valve or emergency piston ring leakage.

On the completion of this test, close the valve 399 and open the valve 401, and move the handle 338 to the No. 8 position to release the fluid under pressure present in the chamber 101. The cover 260 should now be removed and the horseshoe or locking member 287 should be inserted in the annular groove 282 in the piston stop stem 280a, whereupon the cover 260 should be replaced.

The piston stop stem 280a which is employed in connection with the testing of the emergency portion of the valve device is of such a length that when the horseshoe engages the face of the bracket member opposite the emergency portion of the valve device, the piston 100 of the emergency section is held in a position in which the piston is on the right hand side of the charging choke 166.

When the piston 100 is in this position, the slide valve 103 may be in a position so that a port or passage through the slide valve which is controlled by the graduating valve 104 is in alignment with the exhaust passage 170, which would permit fluid under pressure to escape from the valve chamber 102 which is in communication with the auxiliary reservoir 320 when the valve 377 is opened. Fluid which escapes from the valve chamber 102 through the passage 170 is carried to the atmosphere by way of the exhaust passage 128.

Instead of the slide valve 103 being in the position in which fluid can escape through the exhaust passage 170, the end of the slide valve 103 may be moved away from the port communicating with the passage 127, which would permit fluid under pressure to escape from the slide valve chamber 102 to the chamber 126, and therefrom to the atmosphere by way of the restricted passage 131 in the piston 125.

In order to prevent the escape of fluid under pressure to the atmosphere through the passage 128 from either the passage 170 or the passage 127, the sealing device 544 is placed over the end of the passage 128 so that the annular sealing member 547 is in engagement with the wall surrounding the end of the passage 128, and so that the rounded end 549 of the stem 538 is in position in the concave recess 541 in the body of the sealing device. The valve 399 is now opened and fluid under pressure is thereby permitted to flow from the emergency reservoir 321 by way of the pipe 408, the pipe 398, the passage 295 in the bracket member 250, and the passages 519 and 555 in the filling piece 476 to the chamber 532. The pressure of the fluid in the chamber 532 forces the diaphragm 533 downwardly, thereby moving the plunger 536 and the stem 538 against the sealing device so that the sealing device is securely held in position to prevent the escape of fluid from the passage 128. The valve 552 associated with the sealing device should be turned to the closed position.

The apparatus is now in condition to test the piston packing ring and this test is commenced with the valves 390, 443, 399, 382, 377 and 375 open, the other numbered valves being closed and the handle 338 in the No. 3 or lap position. The valve 378 should now be opened and the pressure of the fluid in the auxiliary reservoir 320 and the brake pipe reservoir 329 should be reduced to 60 pounds, at which time the valve 378 should be closed. The valves 382 and 375 should also be closed. The valve 384 should now be opened so as to effect a reduction in the auxiliary reservoir pressure, and in the pressure of the fluid in the valve chamber 102, which communicates with the valve 384 by way of the passage 165 in the valve device, passage 518 in the filling piece, the passage 297 in the bracket member, the pipe 373, the pipe 352 and the open valve 377.

When the valve 384 is opened, the gage 391 should be observed and the drop in the pressure registered by this gage observed. This gage is in communication with the piston chamber 101 by way of the pipe 388, the passage 296 in the bracket member and the passages 516 and 517 in the filling piece. The drop in the pressure of the fluid in the piston chamber 101 will be due to leakage of fluid under pressure from this chamber around the piston packing ring to the valve chamber 102. In this manner the operator can ascertain the condition of the piston packing ring.

At the completion of this test, close the valves 390, 384, and 377 and open the valves 401, 378 and 375. The valve handle 338 should now be moved to the No. 8 position so as to release the fluid under pressure from the piston chamber 101. The cover 260 should now be removed and the horseshoe 287 removed from the piston stop stem, whereupon the cover should be replaced.

The next test is designed to test the capacity of the quick action chamber charging choke 166. This test is begun with the valves 390, 443 and 375 open, the other numbered valves being closed and the valve handle 338 in the No. 8 position.

The valve handle 338 is now moved to the No. 1 position so that fluid under pressure is supplied to the brake pipe reservoir 329 and therefrom to the pipe 370, the pipe 380, the open valve 390, and the pipe 388 to the piston chamber 101. This causes the piston 100 to move to the position in which it is shown in Fig. 16 of the drawings, which is the accelerated release position. When the piston is in this position, fluid under pressure flows from the piston chamber 101 through the restricted passage in the choke 166 to the passage 165, and therefrom by way of the passage 518 in the filling piece 476 and the passage 297 in the bracket member 250 to the pipe 373 and through the open valve 375 to the quick action chamber reservoir 330. The pressure of the fluid in this chamber will be registered by the gage 376, and the operator, by observing the time required to effect a predetermined rise in the pressure of the fluid in the quick action chamber, can determine whether the charging choke is of the proper size.

If the quick action chamber 330 charges too rapidly when the piston 100 is in the accelerated release position, the cause may be an oversize charging choke, and, if on inspection, this is found to be of the proper size, the cause of the too rapid charging of the quick action chamber will be excessive ring leakage in the accelerated release position of the piston.

The valves 399 and 401 should now be opened and the pressure of the fluid in the emergency reservoir 321 reduced to a predetermined pressure, such as 65 pounds, whereupon the valve 401 is closed. The valves 382 and 377 are now opened so that fluid under pressure is supplied from the brake pipe reservoir 329, and from the main reservoir 325 through the operating valve 335 by way of the pipe 380, the pipe 352 and the pipe 373 to the passage 165 in the valve device and therefrom to the valve chamber 102. On an increase in the pressure of the fluid in the valve chamber 102 above the pressure of the fluid in the chamber 160, which is in communication with the emergency reservoir by way of the passage 162 in the valve body, the passage 519 in the filling piece 476, the passage 295 in the bracket member 250, pipe 398, the open valve 399, and the pipe 408, the spill-over check valve elements 155 and 156 will be unseated, and fluid will flow through the restricted passage 161 from the valve chamber 102 to the emergency reservoir. The pressure of the fluid in the emergency reservoir 321 is shown by the gage 405, and by observing this gage and by noting the time required to effect a predetermined increase in the pressure of the fluid in the emergency reservoir, the operator can determine whether or not the restricted passage 161 is of the proper capacity.

The next test is designed to test the stability of the emergency piston 100 during a service operation of a brake valve device of the type which this apparatus is designed to test.

This test is undertaken with the valves 390, 443, 399, 382, 377 and 375 open, the other numbered valves being closed, and the valve handle 338 in the No. 1 position.

The valve 416 is now opened and the operating handle 338 is moved to the No. 3, or lap position. The valve 378 should now be opened and the pressure in the auxiliary reservoir 320 and the quick action chamber reservoir 330 is reduced from the initial pressure of 80 pounds to a predetermined lesser pressure, such as 70 pounds, whereupon the valves 378, 382 and 377 are closed. The valve 401 should now be opened. The pressure in the emergency reservoir, as indicated by the gage 405, should be reduced to 70 pounds. The valve 401 should then be closed.

The operating handle 338 is now moved to position No. 6, in which position fluid is vented or released from the brake pipe reservoir 329, and from the piston chamber 101 through a port formed by a No. 32 drill. The brake pipe reservoir pressure should reduce a predetermined amount, such as 20 pounds, as indicated by the gage 391, without producing movement of the emergency piston 100 to the emergency position.

If the emergency piston 100 moves to the emergency position as a result of a smaller reduction in the brake pipe reservoir pressure, its movement may be due to a restriction in the passage in the slide valve 103, which communicates with the passage 170 in the body of the emergency valve portion, or it may be due to high friction of the emergency piston which prevents the piston from moving to the position in which the graduating valve 104 is moved to the right from the position in which it is shown in Fig. 2 so that the passage through the graduating valve communicates with the port or passage in the slide valve 103 which communicates with the passage 170 in the valve device.

At the completion of this test the handle 338 is moved to the No. 1 position and the valves 424, 382 and 377 are opened. The next test is designed to test the sensitiveness or the responsiveness of the emergency piston to an emergency reduction in brake pipe pressure.

This test is commenced with the valves 390, 443, 416, 399, 424, 382, 377 and 375 open, the other numbered valves being closed, and the valve handle 338 in the No. 1 position. The valve 424 is closed and the handle 338 is moved to the No. 3 or lap position. The valve 378 is now opened so as to reduce the pressure of the fluid in the auxiliary reservoir 320 and quick action chamber 330 to a predetermined pressure, such as 70 pounds, whereupon the valve 378 is closed. The valves 382 and 377 are also closed at this time.

The handle 338 of the valve 325 should now be moved to the No. 7 position in which fluid is released from the brake pipe reservoir 329 at a relatively high rate. Fluid is also released from the piston chamber 101 at the same time as the piston chamber is in communication with the brake pipe reservoir 329 by way of passages 517 and 296, pipe 388, the open valve 390, and the pipe 380.

The operator can determine the reduction in pressure in the piston chamber 101 which is necessary to effect an emergency operation of the emergency piston by observing the pressure registered on the gage 391 at the time the emergency piston moves to the emergency position.

The operator can also determine the rate of reduction in the pressure of the fluid in the quick action chamber 330 by means of the gage 376, and, by knowing the time required to effect a predetermined reduction in the pressure in this chamber, the operator can determine whether or not the restricted passage 131 in the vent valve piston 125 is of the proper capacity.

When the pressure of the fluid in the quick action chamber 330 is reduced to a predetermined value, the valve 378 should be opened and the pressure in this chamber reduced to a relatively low value. The valve 378 should then be closed. Fluid under pressure will continue to be released from the quick action chamber 330 by way of the quick action chamber 102 in the emergency portion being tested and the restricted passage 131 in the piston 125. This reduction should occur at a relatively slow rate until a predetermined low pressure is obtained in the quick action chamber, which pressure is also present in the chamber 126, at which time the vent valve piston 125 should be moved to the position in which it is shown in Fig. 2 of the drawings by means of the spring 139, thereby permitting the vent valve 136 to seat. When the piston 125 moves to this position, the groove 133 is opened so that fluid is permitted to escape from the chamber 126 not only through the restricted passage 131, but also through the groove 133. By observing the pressure present in the quick action chamber at the time the change in the rate of reduction in the pressure in this chamber occurs, the operator can determine whether the vent valve is functioning properly.

At the completion of this test the handle 338 is moved to position No. 1 and the valves 424, 382 and 377 are opened.

The next test is designed to test the inshot valve and is begun with the valves 390, 443, 399, 424, 382 and 377 and 375 open, the other numbered valves being closed and the valve handle 338 in the No. 1 position.

The valve handle 338 is now moved to the No. 3, or lap position, whereupon the valve 400 is opened so as to charge the emergency reservoir to a predetermined pressure, such as 70 pounds. The valve 400 is then closed. The valve 378 should now be opened and the pressure in the brake pipe reservoir 329 and quick action chamber reservoir 330 reduced to the same pressure as that in the emergency reservoir, whereupon the valves 378, 424, 382 and 377 are closed.

The handle 338 is now moved to the No. 8 position so that fluid under pressure is released from the brake pipe reservoir 329, and also from the piston chamber 101, thereby causing the emergency piston 100 to move to the emergency position, which is the position in which it is shown in Fig. 15 of the drawings. When the piston 100 is moved to this position, the slide valve 103 is moved to a position in which a cavity in the slide valve joins the passage 162 which communicates with the emergency reservoir 321, and the passage 223, which communicates with the passage 222 in the emergency portion, which in turn communicates by way of the passages 522 and 521 in the filling piece 478 with the chamber 199 in the emergency portion. Fluid under pressure therefore flows from the emergency reservoir to the chamber 199, and therefrom to the chamber 188 by way of the passage 200, from which it flows through the passage 189 to the passage 190, and thence through the passage 529 in the filling piece 476 and the passage 293 in the bracket member 250 to the pipe 414, and thereafter to the brake cylinder reservoir 322.

Fluid under pressure also flows from the chamber 188 through the passage 186 to the chamber 185, where it acts upon the face of the inshot valve piston 175 located within the seat rib 178, and when the pressure in this chamber has built up to a predetermined value, the piston 175 is moved to the left, as viewed in Fig. 2, against the spring 177 with the result that the valve 196 moves into engagement with the seat rib 198 to cut off communication through the passage 200. When the valve 196 seats, communication between the chamber 199 and the chamber 188 is by way of the restricted passage 203.

The pressure of the fluid in the brake cylinder reservoir 322 is indicated by the gage 425, and the pressure in this reservoir will rise rapidly until the inshot valve 196 closes, and thereafter will rise slowly. By observing the pressure registered on the gage 425 at the time the change in the rate of increase in the pressure of the fluid in the brake cylinder reservoir occurs, the operator can determine the pressure required to close the inshot valve 196, and in this manner can determine whether this valve is operating properly.

The gage 425 is observed for a time interval longer, and the time required for the brake cylinder reservoir to charge to a predetermined pressure is observed. A faster charging time than standard for the brake cylinder reservoir 322 may be due to too large an orifice in the restricted passage 203, or to leakage around the timing valve device, while a too slow charging rate of the brake cylinder reservoir may be caused by restriction of the restricted passage 220 leading from the timing valve.

The next test is designed to test the operation of the accelerated release portion of the valve device and is undertaken with the valves 390, 443, 416, 399 and 375 open, the other numbered valves being closed and the handle 338 in the position No. 8.

The valve 378 should now be opened and fluid under pressure released from the quick action chamber 330. The valve 378 is then closed and the handle 338 is moved to the position No. 1, and the brake pipe reservoir 329 is charged to a relatively low pressure, such as 20 pounds. The handle 338 is then moved to position No. 2. The operator should observe the pressure registered by the gage 391, which is the pressure in the brake pipe reservoir 329, at the time that the quick action chamber begins to charge, this being indicated by the gage 376. When the quick action chamber commences to charge the emergency piston will have moved from the emergency position to the release position.

The handle 338 is permitted to remain in the No. 2 position until the emergency piston 100 moves to the accelerated release position, which is the position of the piston shown in Fig. 16 of the drawings. This may be determined by observing the end of the piston stop stem through the window 265 in the cover 260. As soon as the piston moves to the accelerated release position the handle 338 is moved to the No. 3, or lap position.

As soon as the brake pipe reservoir stops charging, the operator should observe the pressure in the brake pipe reservoir 329, as indicated by the gage 391, and the pressure in the brake cylinder reservoir 322, as indicated by the gage 430. Failure to obtain the proper differential between the pressures in these two reservoirs is due to a spring 148 of improper tension, which controls the flow of fluid from the brake cylinder reservoir 322 to the brake pipe reservoir 329 by way of the pipe 428, passage 292 in the bracket member 250, the passages 521 and 522 in the filling piece 476, the passage 222 in the emergency portion and the passage 223, which, when the piston 100 is in the accelerated release position, is connected by way of a cavity in the slide valve 103 with passage 150 which leads to the accelerated release check valve. Fluid from the accelerated release check valve chamber 151 flows by way of the passage 152 to the passage 141, and therefrom through the passage 516 in the filling piece, and the passage 296 in the bracket member to the pipe 388 which is in communication with the brake pipe reservoir 329 through the open valve 390.

The operator should also observe the difference in the brake pipe reservoir 329 and the brake cylinder reservoir 322 while these pressures are equalizing, and a failure to maintain a proper differential during this period indicates excessive leakage past the check valve member 146.

The next test is undertaken with the valves 390, 443, 416, 399, 424, 382, 377 and 375 open, the other valves being closed and the handle 338 in the No. 1 position.

The valve 424 is now closed and the valve 432 is opened so that fluid from the auxiliary reservoir flows through the pipe 428 to the chamber 199, past the open valve 196 and through the passage 200 to the chamber 188, and therefrom by way of the passage 189 to the passage 190 from which it flows by way of the passage 520 in the filling piece, and the passage 293 in the bracket member to the pipe 414 and through the open valve 416 to the brake cylinder reservoir 322.

Fluid from the auxiliary reservoir also flows from the passage 521 through the passages 522, 222 and 223 to the cavity in the slide valve 103 from which it flows by way of the passage 194 in the inshot piston volume 192 and to the chamber 176 on the left hand side of the valve element 175. This serves to maintain the inshot valve in the open position during this test. The operator can observe the time required to effect a predetermined increase in the pressure of the fluid in the brake cylinder reservoir 322 as shown by the gage 425, and in this way can determine whether the passage leading to the brake cylinder is of the proper capacity.

At the completion of this test the valve 432 is closed and the valve 424 is opened.

The next test is designed to test the return spring 109 and is undertaken with the valves 390, 443, 416, 399, 424, 382, 377 and 375 open, the other numbered valves being closed and the handle 338 being moved to the No. 1 position.

The valve 382 should be closed and the valve 378 partly opened. This permits fluid to escape from the quick action chamber 330 and from the valve chamber 162 by way of the passage 165, and, as a result of the pressure differential created on opposite sides of the piston 100, the piston is moved to the left from the position in which it is shown in Fig. 2, being moved to the position in which it is shown in Fig. 16. On this movement of the piston the spring 109 is compressed. The time at which the piston moves to the accelerated release position may be determined by observing the end of the piston stop stem through the window 265 in the cover 260. At this time the differential between the pressures in the brake pipe reservoir 329, as indicated by the gage 371, and in the quick action chamber 330, as indicated by the gage 376, should be observed.

This will inform the operator as to the pressure differential required to compress the spring 109, and in this manner the operator can determine whether this portion of the valve is in proper working condition.

The valves 378, 399 and 371 should now be closed, and when the piston moves to release position, that is, to the position in which it is shown in Fig. 2 of the drawings, the differential between the pressure in the quick action chamber 330, and in the brake pipe reservoir 329 should be observed.

This indicates the pressure differential on opposite sides of the piston 100 at the time the piston moves to the release position, and is a further check on the condition of the return spring 109.

At the completion of this test close the vlave 443 and move the handle 338 to the position No. 8, open the valve 401 and drain the quick action chamber 330 by opening the valve 378.

The testing of the emergency portion is now complete and this valve portion should now be removed from the test apparatus.

From the foregoing it will be seen that I have provided a test device adapted to be employed to test both the service and emergency portions of a brake controlling valve device of the type shown in the application of C. C. Farmer, Serial No. 612,465, filed May 20, 1932.

It will also be seen that the testing apparatus provided by this invention provides equipment analogous to that employed in actual service, and that means is provided to establish communication between this equipment and between the proper portions of the brake valve sections being tested so that operation of the brake valve section under conditions substantially the same as are encountered in service may be tested.

This apparatus also provides means by which the separate operating units of the brake valve sections being tested may be isolated and tested individually so that the operator may determine whether each of these units is in proper working condition, and if not, the nature and extent of its deviation from standard.

As this apparatus provides means to test individually the operating portions of a brake controlling valve device, it provides means for determining promptly and accurately whether a brake controlling valve device is up to the proper standard of workmanship and general condition, and if not, where the valve device deviates from the standard.

It will be seen also that the test apparatus includes a pair of filling pieces or adapters which are adapted to be employed in testing the emergency and service portions of a brake valve device of the type which this brake apparatus is designed to test and serve to adapt the test apparatus to either of these brake valve portions, although they differ substantially from each other and necessitate different connections with the equipment incorporated in the test device.

In addition, it will be seen that the testing apparatus provided by my invention includes reservoirs analogous to reservoirs employed in service, these being permanently connected to a bracket member having a plurality of ports in a face thereof, and having an adapter which is adapted to be interposed between the face of the bracket member and a face of the valve section being tested, and which has passages extending therethrough and adapted to establish communication between the ports in the face of the bracket member and the ports in the face of the valve section.

In addition it will be seen that the test apparatus provided by this invention includes a bracket member adapted to have a section of a valve device secured thereto, and having an opening therein through which means associated with the piston of the valve device projects, this means being accessible from the side of the bracket member remote from the valve device, whereby the piston of the valve device may be selectively locked in position, or it may be released, without removing the valve device from the bracket member.

It will be seen also that the bracket member has means associated therewith by means of which the position of the valve device piston may be ascertained at any time, and by means of which movement of the piston from one position to another may be observed.

While one embodiment of the test apparatus provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. A filling piece adapted to be employed in the testing of a valve device of the type having a body portion having a face with a plurality of ports therein, said ports communicating with passages associated with elements of the valve device, the valve device having a port communicating with the atmosphere at a point remote from said face, the filling piece comprising a member having a face having a plurality of ports therein arranged so as to be substantially in alignment with the ports in the face of the valve device when said valve device is in position against said face, the filling piece having an arm associated therewith and extending to a point adjacent the port in the valve device remote from said face, said arm having a chamber associated therewith adapted to contain fluid under pressure, a movable abutment subject to the pressure of the fluid in said chamber, and means controlled by said abutment and adapted to close said port remote from said face.

2. A filling piece adapted to be employed in the testing of a valve device of the type having a body portion having a face with a plurality of ports therein, said ports communicating with passages associated with elements of the valve device, the valve device having a vent port communicating with the atmosphere at a point remote from said face, the filling piece comprising a member having a face having a plurality of ports therein arranged so as to be substantially in alignment with the ports in the face of the valve device when said valve device is in position against said face, the filling piece having passages therein communicating with said ports, said filling piece having an arm associated therewith and extending to a point adjacent the vent port, the arm having a chamber associated therewith adapted to contain a quantity of fluid under pressure, a movable abutment subject to the pressure of fluid in said chamber, and means controlled by said abutment and adapted to close said vent port.

3. A filling piece adapted to be employed in the testing of a valve device of the type having a body portion having a face with a plurality of ports therein, said ports communicating with passages associated with elements of the valve device, the valve device having a vent port communicating with the atmosphere at a point remote from said face, the filling piece comprising a member having a face having a plurality of ports therein arranged so as to be substantially in alignment with the ports in the face of the valve device when said valve device is in position against said face, the filling piece having passages therein communicating with said ports, said filling piece having an arm associated therewith and extending to a point adjacent the vent port, the arm having a chamber associated therewith adapted to contain a quantity of fluid under pressure, a movable abutment subject to the pressure of fluid in said chamber, a passage communicating with said chamber and with a passage associated with a port in the face of the filling piece, and means controlled by said abutment and adapted to close said vent port.

4. In a testing apparatus for testing a brake controlling valve device of the type having a body having a face having a plurality of ports therein, said ports communicating with operating elements of the valve device, said body having a piston chamber therein opening on said face and a piston reciprocally movable in said chamber, the testing apparatus comprising a bracket member having a face having a plurality of ports therein adapted to communicate with the ports in the face of the valve device to be tested when the valve device is secured relative thereto, the bracket member having an opening therein disposed substantially in alignment with the piston chamber of the valve device, a member adapted to be secured to the piston and to extend through the opening in the bracket member, and means to secure said member relative to the bracket member to prevent movement of the valve device piston away from the bracket member beyond a predetermined point.

5. In a testing apparatus for testing a brake controlling valve device of the type having a body having a face having a plurality of ports therein, said ports communicating with operating elements of the valve device, said body having a piston chamber therein opening on said face and a piston reciprocally movable in said chamber, the testing apparatus comprising a bracket member having a face having a plurality of ports therein adapted to communicate with the ports in the face of the valve device to be tested when the valve device is secured relative thereto, the bracket member having an opening therein disposed substantially in alignment with the piston chamber of the valve device, and means extending through the opening in said bracket member and operable to prevent movement of the valve device piston away from the bracket member beyond a predetermined point.

6. In a testing apparatus for testing a brake controlling valve device of the type having a body having a face having a plurality of ports therein, said ports communicating with operating elements of said valve device, said body having a piston chamber therein opening on said face and having a piston reciprocable in said piston chamber, the testing apparatus comprising a bracket member adapted to have a valve device secured relative thereto, said bracket member having an opening therein positioned substantially in alignment with the piston chamber in the valve device when the said valve device is in position relative to said bracket member, a member adapted to be secured to said valve device piston and to project through the opening in said bracket member, and means adapted to be detachably secured to said member to limit movement of the valve device piston away from the bracket member.

7. In a testing apparatus for testing a brake controlling valve device of the type having a body having a face having a plurality of ports therein, said ports communicating with operating elements of said valve device, said body having a piston chamber therein opening on said face and having a piston reciprocable in said piston chamber, the testing apparatus comprising a bracket member adapted to have a valve device secured relative thereto, said bracket member having an opening therein positioned substantially in alignment with the piston chamber in the valve device when the said valve device is in position relative to said bracket member, a member adapted to be secured to said valve device piston and to project through the opening in said bracket member, and means adapted to be detachably secured to said member and accessible on the face of the bracket member remote from the valve device and operable through said member to limit movement of the valve device piston away from the bracket member.

8. In a testing apparatus for testing a brake controlling valve device of the type having a body having a face having a plurality of ports therein, said ports communicating with operating elements of the valve device, said body having a piston chamber therein opening on said face and having a piston reciprocable in said piston chamber, the testing apparatus comprising a bracket member adapted to have a valve device secured relative thereto, said bracket member having an opening therein positioned substantially in alignment with the piston chamber in the valve device when the said valve device is in position relative to said bracket member, a stem adapted to be detachably secured to the valve piston and to project into the opening in the bracket member, and a cover detachably secured on the side of the bracket member remote from the valve device and closing the opening in the bracket member, said cover having a transparent portion through which the stem is visible, whereby the position of the piston in said chamber may be determined.

9. In a testing apparatus for testing a brake controlling valve device of the type having a body having a face having a plurality of ports therein, said ports communicating with operating elements of the valve device, said body having a piston chamber therein opening on said face and having a piston reciprocable in said piston chamber, the testing apparatus comprising a bracket member having a face having a plurality of ports therein adapted to communicate with ports in the face of a valve device when said valve device is secured in position relative thereto, the bracket member having an opening therein substantially in alignment with the piston chamber in the valve device, a stem adapted to be secured to the valve device piston and to extend into the opening in the bracket member, means adapted to be detachably secured to the stem from the side of the bracket member remote from the valve device and operable through said stem to limit movement of the valve device piston away from the bracket member, and a cover detachably secured on the side of the bracket member remote from the valve device and closing the opening in the bracket member, said cover having a transparent portion through which the stem is visible, whereby the position of the piston in said piston chamber may be determined.

10. In testing apparatus for testing a brake controlling valve device of the type having a valve chamber having a slide valve positioned therein, a piston in said valve chamber and movable therein responsive to differences in the pressures in the fluid on opposite sides thereof, a pair of feed grooves controlled by said piston, the piston being adapted in one position to permit communication through both of said feed grooves and in another position to permit communication through one of said feed grooves, and having means yieldingly opposing movement of the piston to said last named position, the testing apparatus comprising a reservoir analogous to an auxiliary reservoir, means for connecting said reservoir to said valve chamber on one side of the piston, a source of fluid under pressure, means for connecting said source to a passage in the valve device communicating with the valve chamber at a point on the other side of the piston, means for indicating the position of the piston in said chamber, and means for indicating the pressure of the fluid in the auxiliary reservoir and in the passage communicating with the valve chamber and the source of fluid under pressure, whereby the differences in the pressures of the fluid on opposite sides of the said piston effective to move the piston against the means yieldingly opposing movement thereof may be determined.

11. In apparatus to test a valve device of the type having a movable abutment subject to brake pipe pressure, a main valve operated by said abutment for controlling a passage communicating with a brake cylinder and with a brake pipe, means yieldingly opposing movement of the abutment to a position to move the valve to effect opening of said passage, and having a passage adapted to communicate with the brake pipe and with a quick action chamber adapted to contain a quantity of fluid under pressure, the testing apparatus comprising a source of fluid under pressure, means for connecting said source to a pipe adapted to be connected to a passage in the valve device which is adapted to be connected to the brake pipe, a reservoir analogous to the quick action chamber, means for connecting the reservoir to the passage in the valve device adapted to be connected to the quick action chamber, means for indicating the pressure of the fluid in the pipe adapted to be connected to the brake pipe passage and in the reservoir analogous to the quick action chamber, and means for indicating movements of the movable abutment.

12. In apparatus to test a brake controlling valve device comprising a body having a valve chamber therein, a valve seat in said valve chamber, a slide valve reciprocable on said seat, a passage communicating with said seat and with the atmosphere, the slide valve controlling communication between the valve chamber and said passage, said valve device body having a piston chamber therein, a piston reciprocable in said chamber and controlling said slide valve, a wall of said chamber having a charging port therein communicating with the valve chamber, the piston being movable between a position intermediate the valve chamber and the charging port and a position on the side of the charging port remote from the valve chamber, the testing apparatus comprising means to secure the valve device piston in a position on the side of the charging port remote from the valve chamber, means for establishing a predetermined fluid pressure in the piston chamber on the side of the piston remote from the valve chamber and in the valve chamber, means for closing the passage leading from the valve seat to the atmosphere, means for reducing the pressure of the fluid in the valve chamber, and means for indicating the pressure of the fluid in the piston chamber.

13. In a testing apparatus for testing a valve device of a type comprising a body having a mounting face having a plurality of ports therein having passages associated therewith and communicating with operating elements of the valve device, the testing apparatus comprising a bracket having a mounting face having a greater number of ports therein than are provided in the face of the body of the valve device, the ports in the bracket being arranged differently than the ports in the body of the valve device, passages communicating with the ports in the bracket and through which fluid under pressure may be supplied to and released from the said ports, and a filling piece comprising a body having a mounting face adapted to be secured against the mounting face of the bracket, said face of the filling piece having a lesser number of ports therein than are provided in the mounting face of the bracket, the ports in the filling piece being adapted to be in communication with selected ports of the ports in the bracket when the filling piece is secured thereagainst, the filling piece being adapted to cut off communication through the other ports in the bracket, the filling piece also having a mounting face adapted to have the mounting face of the valve device secured thereagainst, said face of the filling piece having a plurality of ports therein communicating with the ports in the other face of the filling piece and adapted to communicate with the ports in the mounting face of the valve device when the said valve device is secured thereagainst.

14. A filling piece adapted to be employed in the testing of a valve device of the type having a body portion having a face with a plurality of ports therein, said ports communicating with passages associated with elements of the valve device, the valve device also having a port communicating with the atmosphere at a point remote from said face, the filling piece comprising a member having a face having a plurality of ports therein arranged so as to be substantially in alignment with the ports in the face of the valve device when said valve device is in position against said face, the filling piece having an arm associated therewith and extending to a point adjacent the port in the valve device remote from said face, and means associated with said arm and operative to close the port in the said valve device remote from the said face.

15. In a testing apparatus for testing a valve device of the type having a face having a plurality of ports therein, said ports communicating with operating elements of the valve device, said body also having a piston chamber therein opening on said face and a piston reciprocable in said chamber, the testing apparatus comprising a stem adapted to be secured to the piston and extend therefrom so as to project from the face of the body of the valve device in certain positions of said piston, a bracket having a face having a plurality of ports therein adapted to communicate with the ports in the face of the valve device to be tested when the valve device is secured relative thereto, the bracket having a portion disposed substantially in alignment with the piston chamber of a valve device secured thereto and adapted to receive said stem, and a member adapted to be detachably connected to said stem and cooperating with said bracket to secure said stem and thereby secure said piston against movement in one direction relative to said bracket.

16. In a testing apparatus for testing a valve device of the type having a body having a face having a plurality of ports therein, said ports communicating with operating elements of the valve device, said body also having a piston chamber therein opening on said face and a piston reciprocable in said chamber, the testing apparatus comprising a stem adapted to be secured to the piston and to extend therefrom so as to project from the face of the valve device in certain positions of the piston, a bracket having a face having a plurality of ports therein adapted to communicate with the ports in the face of a valve device to be tested when the valve device is secured relative thereto, the bracket having a portion disposed substantially in alignment with the piston chamber of a valve device secured relative thereto and adapted to receive said stem, and a member adapted to be projected into the path of movement of a portion of the said stem to secure said stem and thereby secure the piston of the valve device against movement in one direction relative to said bracket.

17. In a testing apparatus for testing a valve device of the type having a body having a piston chamber therein opening on a face thereof, and having a piston reciprocable in said chamber, the testing apparatus comprising a stem adapted to be operatively connected to the piston and to extend therefrom so as to project from the face of the valve device in certain positions of the piston, a bracket having a face having a portion disposed substantially in alignment with the piston chamber of a valve device secured relative thereto and adapted to receive said stem, and a member adapted to be projected into the path of movement of a portion of the said stem to secure said stem and thereby secure the piston of the valve device against movement in one direction relative to said bracket.

18. In a testing apparatus for testing a brake controlling valve device of the type having a body having an operating chamber therein containing a piston device and valve mechanism operated by said piston device, the piston device being reciprocably movable in said chamber, the operating chamber opening on a face of the said body, the testing apparatus comprising a stem adapted to be detachably secured to said piston device and to extend therefrom so as to project from the face of the body in one position of the said piston device, a bracket having a face having a portion disposed substantially in alignment with the operating chamber of the valve device when the body of the valve device is secured relative thereto and adapted to receive said stem, and a member adapted to be projected in the path of movement of a portion of the said stem to secure said stem and thereby secure said piston device against movement in one direction relative to the said bracket.

19. In a testing apparatus for testing a valve device of the type having a body having a face having a plurality of ports therein, said ports communicating with operating elements of the valve device, said body having an operating chamber therein opening on said face and containing a piston device and valve mechanism operated by said piston device, the piston device being reciprocally movable in said chamber, the testing apparatus comprising a stem adapted to be detachably connected to said piston device and to extend therefrom so as to project from the face of the body in one position of the piston device, a bracket having a face having a plurality of ports therein adapted to communicate with the ports in the face of a valve device to be tested when the valve device is secured relative thereto, the bracket having a portion disposed substantially in alignment with the operating chamber of a valve device secured relative thereto and adapted to receive said stem, and a member adapted to be detachably connected to said stem and cooperating with said bracket to secure said stem and thereby secure said piston device against movement in one direction relative to said bracket.

20. In apparatus for testing a valve device of a type comprising a body having a mounting face having a plurality of ports therein having passages associated therewith and communicating with operating elements of the valve device, the testing apparatus comprising a bracket having a mounting face having a greater number of ports therein than are provided in the face of the body of the valve device, the ports in the bracket being arranged differently than the ports in the body of the valve device, the bracket having passages therein communicating with the ports therein and through which fluid under pressure may be supplied to and released from said ports, and a filling piece comprising a body having a mounting face adapted to be secured against the mounting face of the bracket, said face of the filling piece having a lesser number of ports therein than are provided in the mounting face of the bracket, the ports in the filling piece being adapted to be in communication with selected ports in the bracket when the filling piece is secured thereagainst, the filling piece also having a mounting face adapted to have the mounting face of a valve device to be tested secured thereagainst, said face of the filling piece having a plurality of ports therein communicating with the ports in the other face thereof and adapted to communicate with the ports in the mounting face of a valve device when the said valve device is secured thereagainst.

21. In apparatus for testing a brake controlling valve device of the type having a body having a mounting face thereon, a bore therein opening on said mounting face, and a piston reciprocable in said bore, said body having a valve chamber therein on the side of the piston remote from the mounting face on the body, the testing apparatus comprising a bracket having a mounting face thereon adapted to have the mounting face on the body of the valve device secured relative thereto, means associated with said bracket for supplying fluid under pressure to the chambers at the opposite sides of the piston of the valve device being tested, and means associated with said bracket for indicating the position of the piston in the bore in the body of the valve device being tested.

22. In apparatus for testing a brake controlling valve device of the type having a body having a mounting face thereon, a bore therein opening on said mounting face, and a piston reciprocable in said bore, said body having a valve chamber therein on the side of the piston remote from the mounting face on the body, the testing apparatus comprising a bracket having a mounting face thereon adapted to have the mounting face on the body of the valve device secured relative thereto, means associated with said bracket for establishing fluid pressures in the chambers on opposite sides of the piston of a valve device being tested and for thereafter varying the pressure of the fluid in one of said chambers, and means associated with said bracket for indicating the position of the piston in the bore in the body of the valve device being tested.

FRANK B. THOMAS.